US012621012B1

(12) United States Patent
Winter et al.

(10) Patent No.: US 12,621,012 B1
(45) Date of Patent: May 5, 2026

(54) METHOD TO MECHANICALLY ISOLATE AND ELECTRICALLY COUPLE BETWEEN A PHASED ARRAY TRANSMIT/RECEIVE BOARD

(71) Applicant: CAES Systems LLC, Arlington, VA (US)

(72) Inventors: Jack Winter, Colorado Springs, CO (US); Dean Pizio, Colorado Springs, CO (US); Michael Simon, Colorado Springs, CO (US)

(73) Assignee: CAES Systems LLC, Arlington, VA (US)

( * ) Notice: Subject to any disclaimer, the term of this patent is extended or adjusted under 35 U.S.C. 154(b) by 404 days.

(21) Appl. No.: 18/127,125

(22) Filed: Mar. 28, 2023

Related U.S. Application Data

(60) Provisional application No. 63/391,978, filed on Jul. 25, 2022.

(51) Int. Cl.
| | |
|---|---|
| *H04M 1/00* | (2006.01) |
| *H04B 1/04* | (2006.01) |
| *H04B 1/10* | (2006.01) |
| *H04B 5/75* | (2024.01) |

(52) U.S. Cl.
CPC ............. *H04B 1/0475* (2013.01); *H04B 1/10* (2013.01); *H04B 5/75* (2024.01)

(58) Field of Classification Search
CPC ........ H04B 1/0053; H04B 1/587; H04B 1/40; H04B 5/75; H04B 1/163; H04B 1/18
See application file for complete search history.

(56) References Cited

U.S. PATENT DOCUMENTS

| | | | | |
|---|---|---|---|---|
| 9,184,504 | B2 * | 11/2015 | Tatarnikov | ........... H01Q 9/0464 |
| 9,601,819 | B2 * | 3/2017 | Herbsommer | ........... H01P 3/16 |
| 9,917,008 | B2 * | 3/2018 | Hollis | ................. H01L 23/5227 |

* cited by examiner

*Primary Examiner* — Tuan Pham
(74) *Attorney, Agent, or Firm* — Alston & Bird LLP

(57) ABSTRACT

Methods, systems, and apparatuses for mechanically isolating and electrically coupling a transmit/receive board with one or more antennae are provided. For example, a transmit/received board may be mechanically isolated and electrically coupled to a 3D printed phased array antenna. The electrical coupling may be with a plurality of couplers. A first coupler may be associated with the transmit/receive board and a second coupler may be associated with the antenna. Near-field coupling of the first coupler and second coupler allow for a signal to be transmitted and received without mechanical coupling.

14 Claims, 18 Drawing Sheets

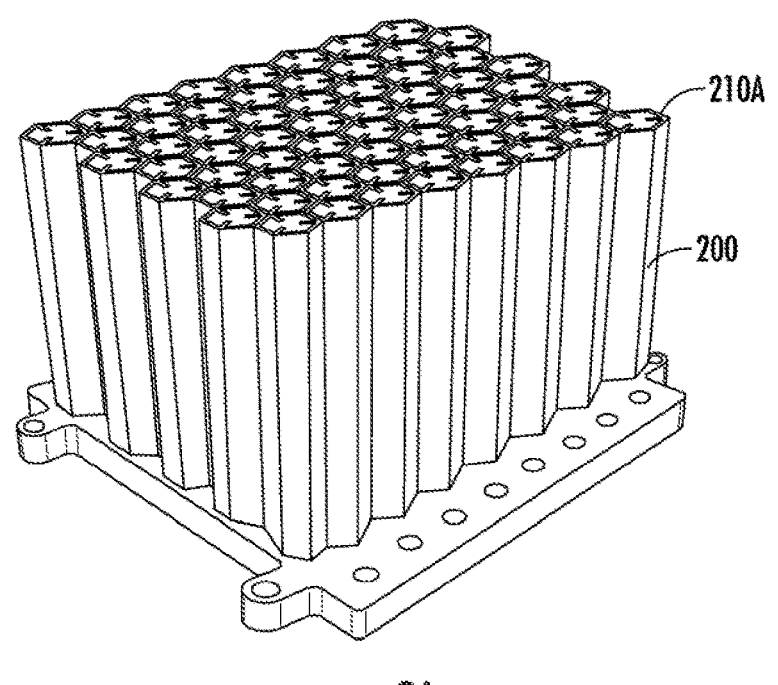
FIG. 2A
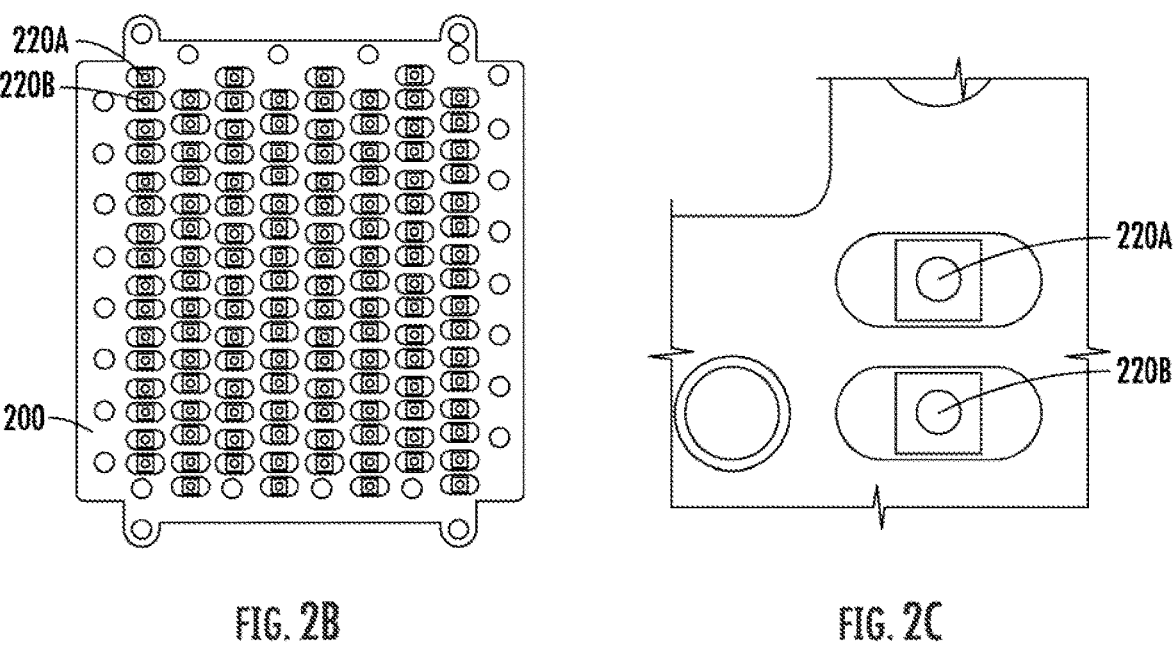
FIG. 2B
FIG. 2C

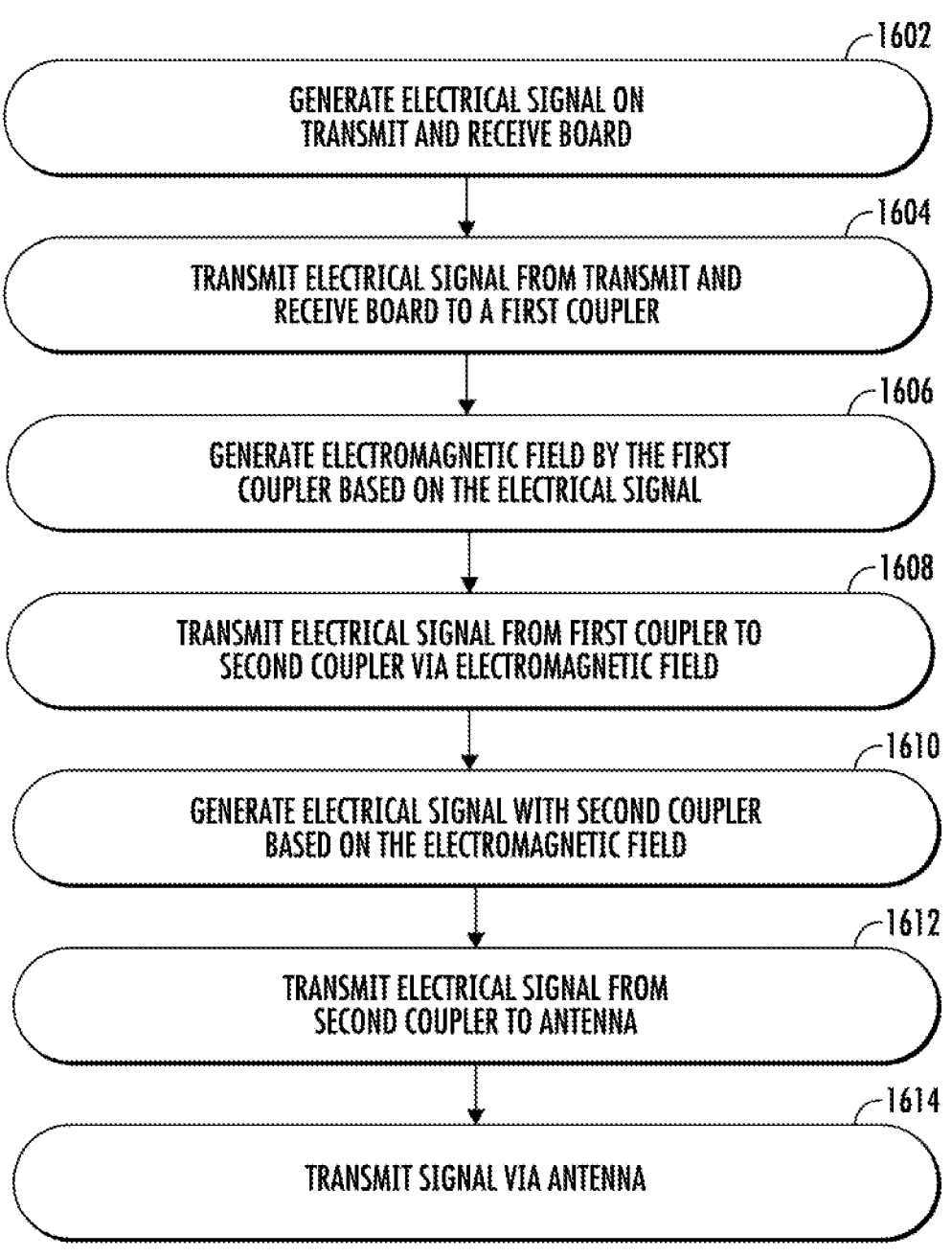

1602
GENERATE ELECTRICAL SIGNAL ON
TRANSMIT AND RECEIVE BOARD

1604
TRANSMIT ELECTRICAL SIGNAL FROM TRANSMIT AND
RECEIVE BOARD TO A FIRST COUPLER

1606
GENERATE ELECTROMAGNETIC FIELD BY THE FIRST
COUPLER BASED ON THE ELECTRICAL SIGNAL

1608
TRANSMIT ELECTRICAL SIGNAL FROM FIRST COUPLER TO
SECOND COUPLER VIA ELECTROMAGNETIC FIELD

1610
GENERATE ELECTRICAL SIGNAL WITH SECOND COUPLER
BASED ON THE ELECTROMAGNETIC FIELD

1612
TRANSMIT ELECTRICAL SIGNAL FROM
SECOND COUPLER TO ANTENNA

1614
TRANSMIT SIGNAL VIA ANTENNA

FIG. 16

METHOD TO MECHANICALLY ISOLATE AND ELECTRICALLY COUPLE BETWEEN A PHASED ARRAY TRANSMIT/RECEIVE BOARD

CROSS-REFERENCE TO RELATED APPLICATIONS

This application claims the benefit of U.S. Provisional Patent Application No. 63/391,978, which was filed on Jul. 25, 2022, the entire contents of which are incorporated by reference herein for all purposes.

TECHNOLOGICAL FIELD

Example embodiments of the present disclosure relate generally to electrically coupling a transmit/receive board to an antenna, particularly to methods, systems, and apparatuses for mechanically isolating and electrically coupling a transmit/receive board.

BACKGROUND

Transmit/receive boards include circuitry for the transmitting of and the receiving of signals through antenna(s). To connect the transmit/receive board to an antenna conventionally includes directly connecting the transmit/receive board and the antenna. Connections may be made by soldering a plurality of electrical connections on the transmit/receive board and with an associated plurality of electrical connections on the antenna. As the antennas are directly connected to the transmit/receive board, the solder bears some of the weight of the antenna. As antennas increase in weight and/or complexity, including by having multiple antenna elements such as in phased arrays, the weight of the antenna may increase. However, the increased weight may crush the solder or other material or other connector used. This damage may degrade, damage, or destroy the electrical connection.

Another conventional mechanical and electrical coupling involves connectors (e.g., GPO, GPPO, G3PO, G4PO) that provide a mechanical and electrical connection between the transmit/receive board and the antenna. Connectors, however, are expensive and add complexity, particularly as the number of electrical connections to make increase. For example, manufacturing a transmit/receive board coupled to an antenna with an electrical connector involves a plurality of additional connectors that need to be separately connected. To connect a transmit/receive board to an antenna array with a plurality of connectors requires an amount of pressure during manufacturing that increases a risk of damaging the transmit/receive board and/or the antenna array. For example, 50 pounds per square inch (PSI) of pressure or more may be needed. Additionally, once the transmit/receive board and antenna are connected, the connectors make it difficult to separate the transmit/receive board from the antenna without damaging the transmit/receive board, the antenna array, and/or the connectors. Damage from separation may not only cause the device to fail but is also expensive and requires replacement of components that may be damaged.

The inventor has identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein relate to methods, systems, and apparatuses for mechanically isolating and electrically coupling a phased array transmit/receive board and an antenna.

In accordance with some embodiments of the present disclosure, an example mechanically isolated and electrically coupled transmission apparatus comprising is provided. In some embodiments the mechanically isolated and electrically coupled transmission apparatus comprising an antenna comprising at least one antenna element; a transmit/receive board comprising at least one signal pin pad, wherein the signal pin pad is associated with at least one antenna element; a first structure associated with the transmit/receive board and associated with a first coupler, wherein the first coupler is electrically connected to the signal pin pad; a second structure associated with the antenna and associated with a second coupler, wherein the second coupler is electrically connected to the at least one antenna element; and wherein the first structure and the second structure are mechanically isolated and electrically coupled via the first coupler and the second coupler.

In some embodiments, wherein the first coupler comprises a first trace in a first serpentine pattern with at least a first resonant frequency of the first trace at a first frequency, and wherein the second coupler comprises a second trace in a second serpentine pattern with at least a first resonant frequency of the second trace at the first frequency.

In some embodiments, the first coupler comprises a first spiral ring resonator with at least a first resonant frequency of the first spiral ring resonator at a first frequency, and wherein the second coupler comprises a second spiral ring resonator with at least a first resonant frequency of the second spiral ring resonator at the first frequency.

In some embodiments, the first coupler comprises a first split ring resonator with at least a first resonant frequency of the first split ring resonator at first frequency, and wherein the second coupler comprises a second split ring resonator with at least a first resonant frequency of the second split ring resonator at the first frequency.

In some embodiments, the first coupler comprises a monopole antenna with at least a first resonant frequency of the monopole antenna at first frequency, and wherein the second coupler comprises helical coil with at least a first resonant frequency of the helical coil at the first frequency.

In some embodiments, the first coupler comprises a first helical coil with at least a first resonant frequency of the first helical coil at first frequency, and wherein the second coupler comprises a second helical coil with at least a first resonant frequency of the second helical coil at the first frequency.

In some embodiments, the antenna comprises one or more 3D printed structures.

In accordance with some embodiments of the present disclosure, an example method of transmitting a signal is provided. In some embodiments the method of transmitting comprises providing a mechanically isolated and electrically coupled transmission apparatus comprising: an antenna comprising at least one antenna element; a transmit/receive board comprising at least one signal pin pad, wherein the signal pin pad is associated with the at least one antenna element; a first structure associated with the transmit/receive board and associated with a first coupler, wherein the first coupler is electrically connected to the signal pin pad; a second structure associated with the antenna and associated with a second coupler, wherein the second coupler is electrically connected to the at least one antenna element; and wherein the first structure and the second structure are mechanically isolated and electrically coupled via the first coupler and the second coupler. The method further comprises transmitting a first signal from the at least one signal pin pad to the first structure; transmitting the first signal from the first structure to the second structure via the electrically coupled first coupler and second coupler; transmitting the first signal from the second coupler to the antenna; and radiating the first signal from the antenna.

In some embodiments of the method of transmitting a signal, the first coupler comprises a first trace in a first serpentine pattern with at least a first resonant frequency of the first trace at a first frequency, and wherein the second coupler comprises a second trace in a second serpentine pattern with at least a first resonant frequency of the second trace at the first frequency.

In some embodiments of the method of transmitting a signal, the first coupler comprises a first spiral ring resonator with at least a first resonant frequency of the first spiral ring resonator at a first frequency, and wherein the second coupler comprises a second spiral ring resonator with at least a first resonant frequency of the second spiral ring resonator at the first frequency.

In some embodiments of the method of transmitting a signal, the first coupler comprises a first split ring resonator with at least a first resonant frequency of the first split ring resonator at first frequency, and wherein the second coupler comprises a second split ring resonator with at least a first resonant frequency of the second split ring resonator at the first frequency.

In some embodiments of the method of transmitting a signal, the first coupler comprises a monopole antenna with at least a first resonant frequency of the monopole antenna at first frequency, and wherein the second coupler comprises helical coil with at least a first resonant frequency of the helical coil at the first frequency.

In some embodiments of the method of transmitting a signal, the first coupler comprises a first helical coil with at least a first resonant frequency of the first helical coil at first frequency, and wherein the second coupler comprises a second helical coil with at least a first resonant frequency of the second helical coil at the first frequency.

In some embodiments of the method of transmitting a signal, the antenna comprises one or more 3D printed structures.

In accordance with some embodiments of the present disclosure, an example a method of receiving a signal is provided. In some embodiments the method of receiving a signal comprises providing a mechanically isolated and electrically coupled transmission apparatus comprising: an antenna comprising at least one antenna element; a transmit/receive board comprising at least one signal pin pad, wherein the signal pin pad is associated with the at least one antenna element; a first structure associated with the transmit/receive board and associated with a first coupler, wherein the first coupler is electrically connected to the signal pin pad; a second structure associated with the antenna and associated with a second coupler, wherein the second coupler is electrically connected to the at least one antenna element; and wherein the first structure and the second structure are mechanically isolated and electrically coupled via the first coupler and the second coupler; receiving a first signal at the antenna; transmitting the first signal from the antenna to the second coupler; transmitting the first signal from the second structure to the first structure via the electrically coupled second coupler and first coupler; and transmitting the first signal from the first structure to the at least one signal pin pad.

In some embodiments of the method of receiving a signal, the first coupler comprises a first trace in a first serpentine pattern with at least a first resonant frequency of the first trace at a first frequency, and wherein the second coupler comprises a second trace in a second serpentine pattern with at least a first resonant frequency of the second trace at the first frequency.

In some embodiments of the method of receiving a signal, wherein the first coupler comprises a first spiral ring resonator with at least a first resonant frequency of the first spiral ring resonator at a first frequency, and wherein the second coupler comprises a second spiral ring resonator with at least a first resonant frequency of the second spiral ring resonator at the first frequency.

In some embodiments of the method of receiving a signal, the first coupler comprises a first split ring resonator with at least a first resonant frequency of the first split ring resonator at first frequency, and wherein the second coupler comprises a second split ring resonator with at least a first resonant frequency of the second split ring resonator at the first frequency.

In some embodiments of the method of receiving a signal, the first coupler comprises a monopole antenna with at least a first resonant frequency of the monopole antenna at first frequency, and wherein the second coupler comprises helical coil with at least a first resonant frequency of the helical coil at the first frequency.

In some embodiments of the method of receiving a signal, the first coupler comprises a first helical coil with at least a first resonant frequency of the first helical coil at first frequency, and wherein the second coupler comprises a second helical coil with at least a first resonant frequency of the second helical coil at the first frequency.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Figure 1A:
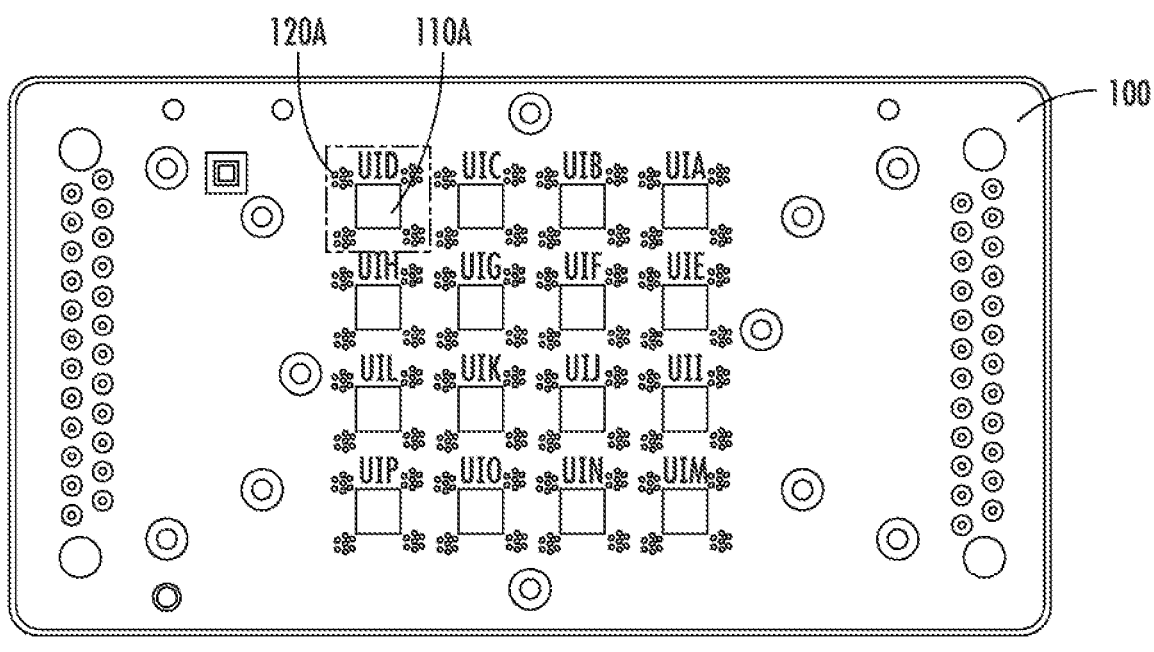
Figure 1B:
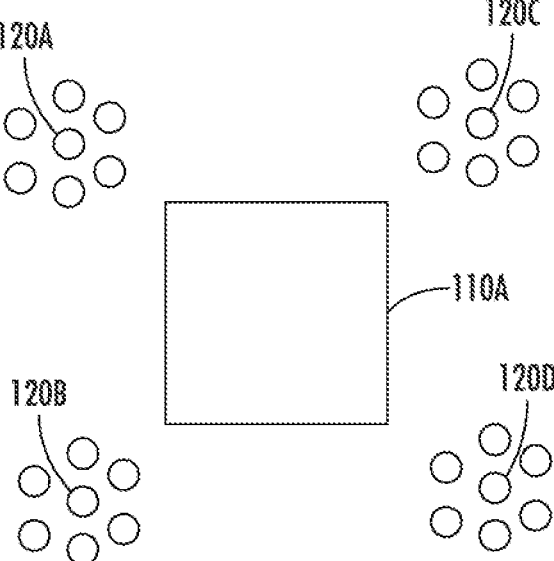
Figure 3A:
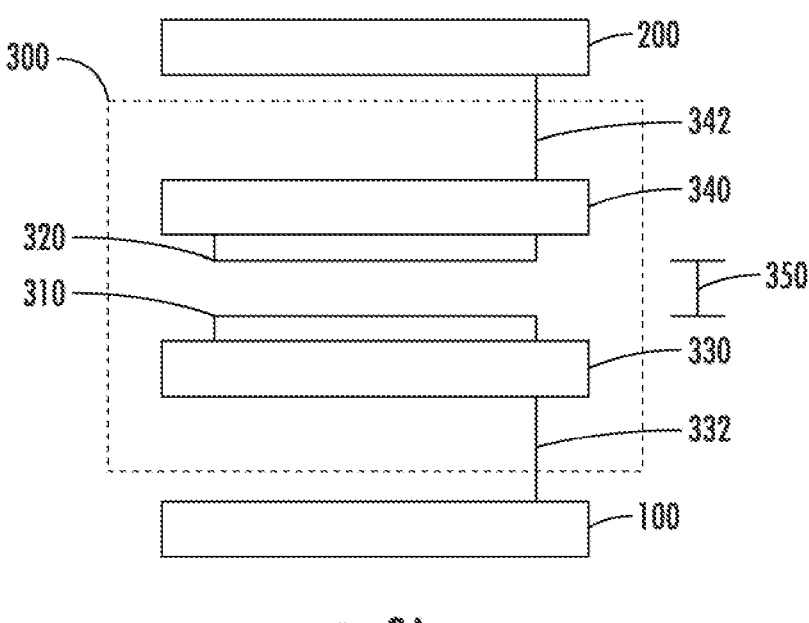
Figure 3B:
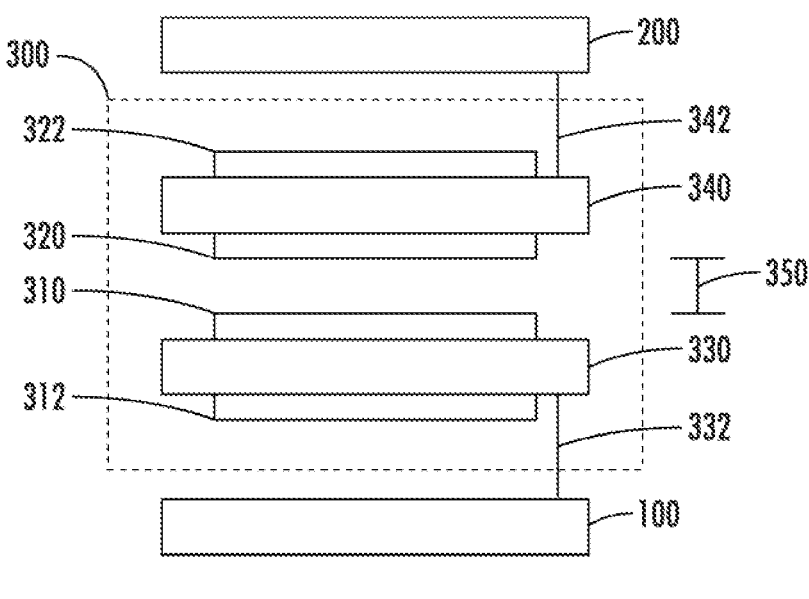
Figure 4:
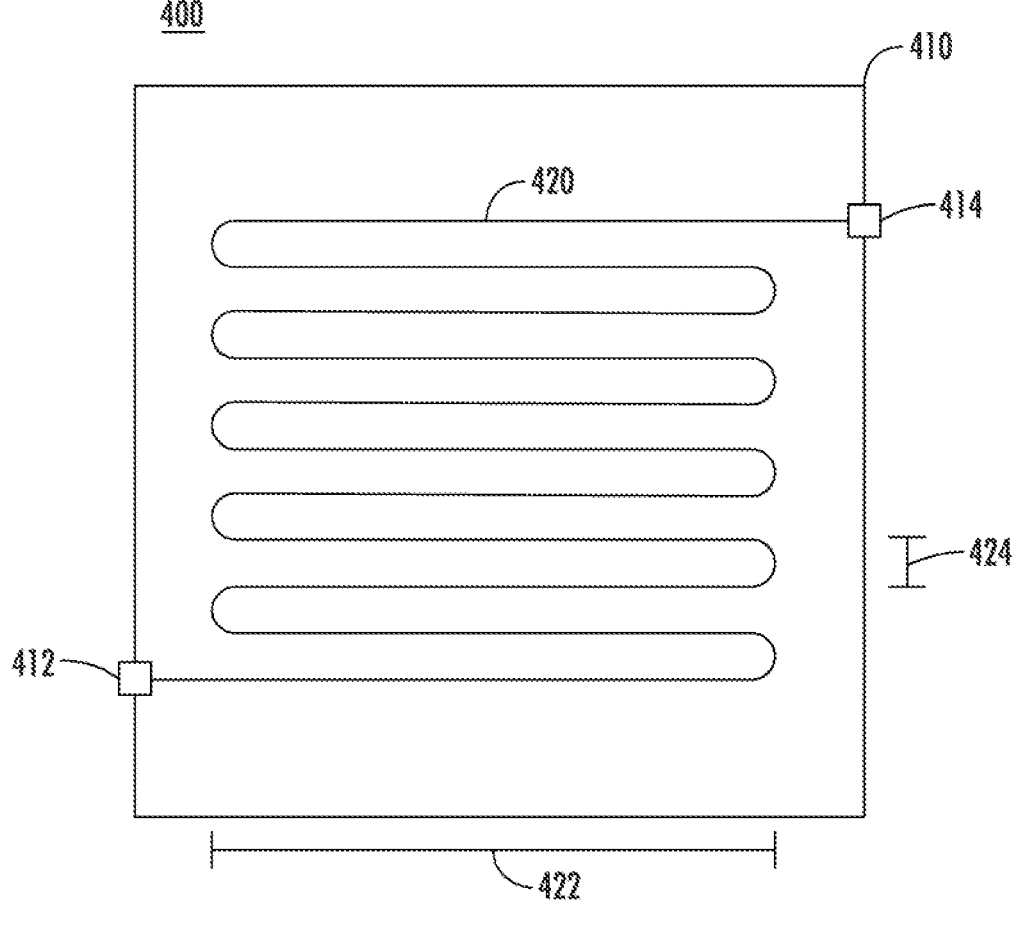
Figure 5:
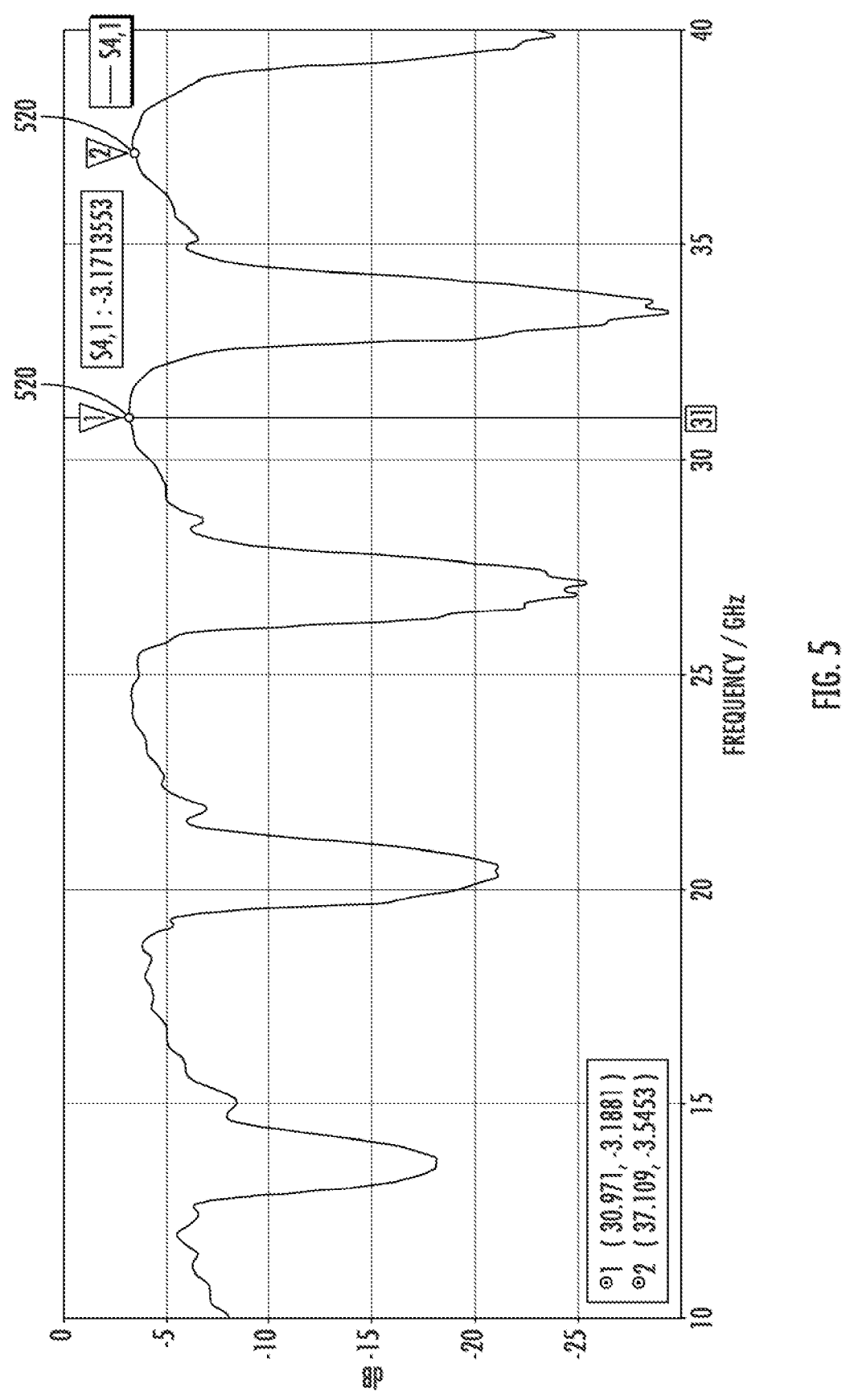
Figure 6:
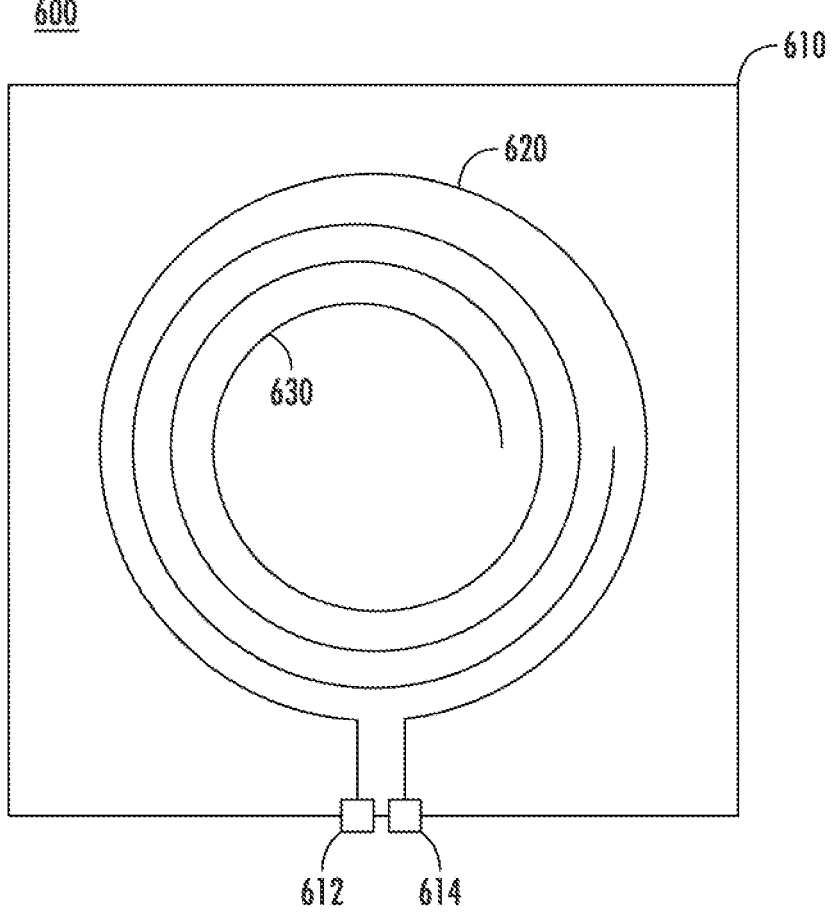
Figure 7:
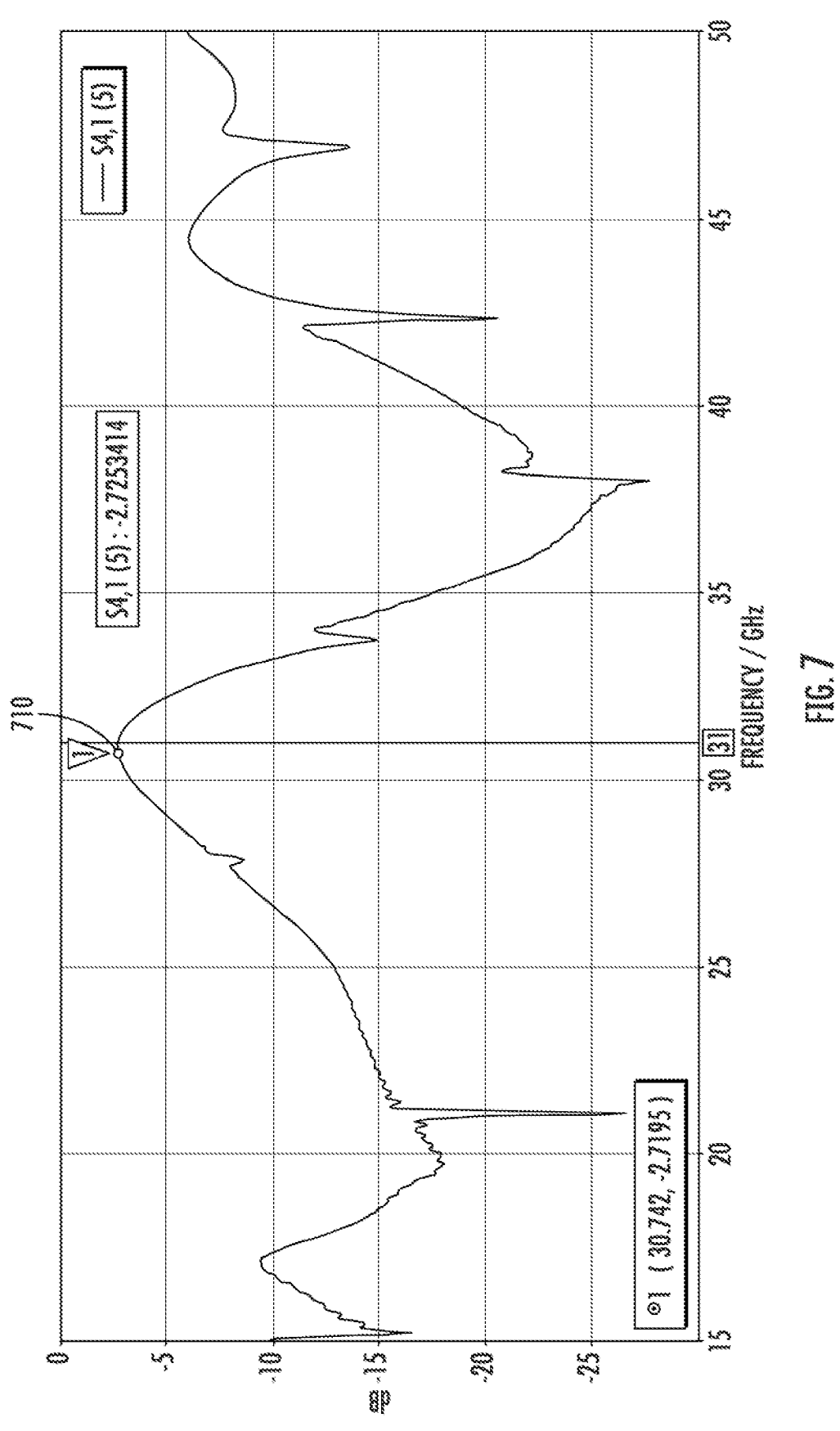
Figure 8:
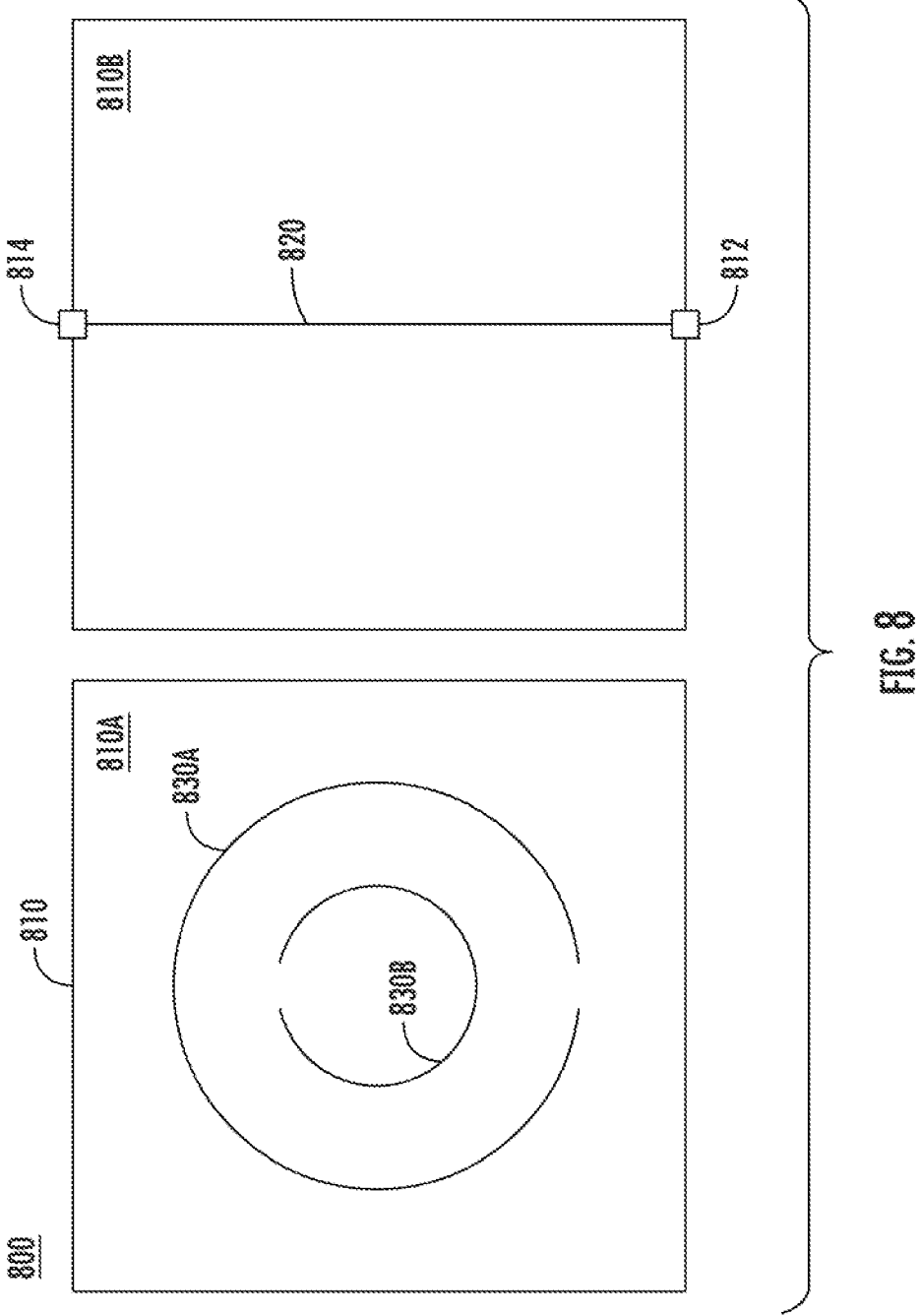
Figure 9:
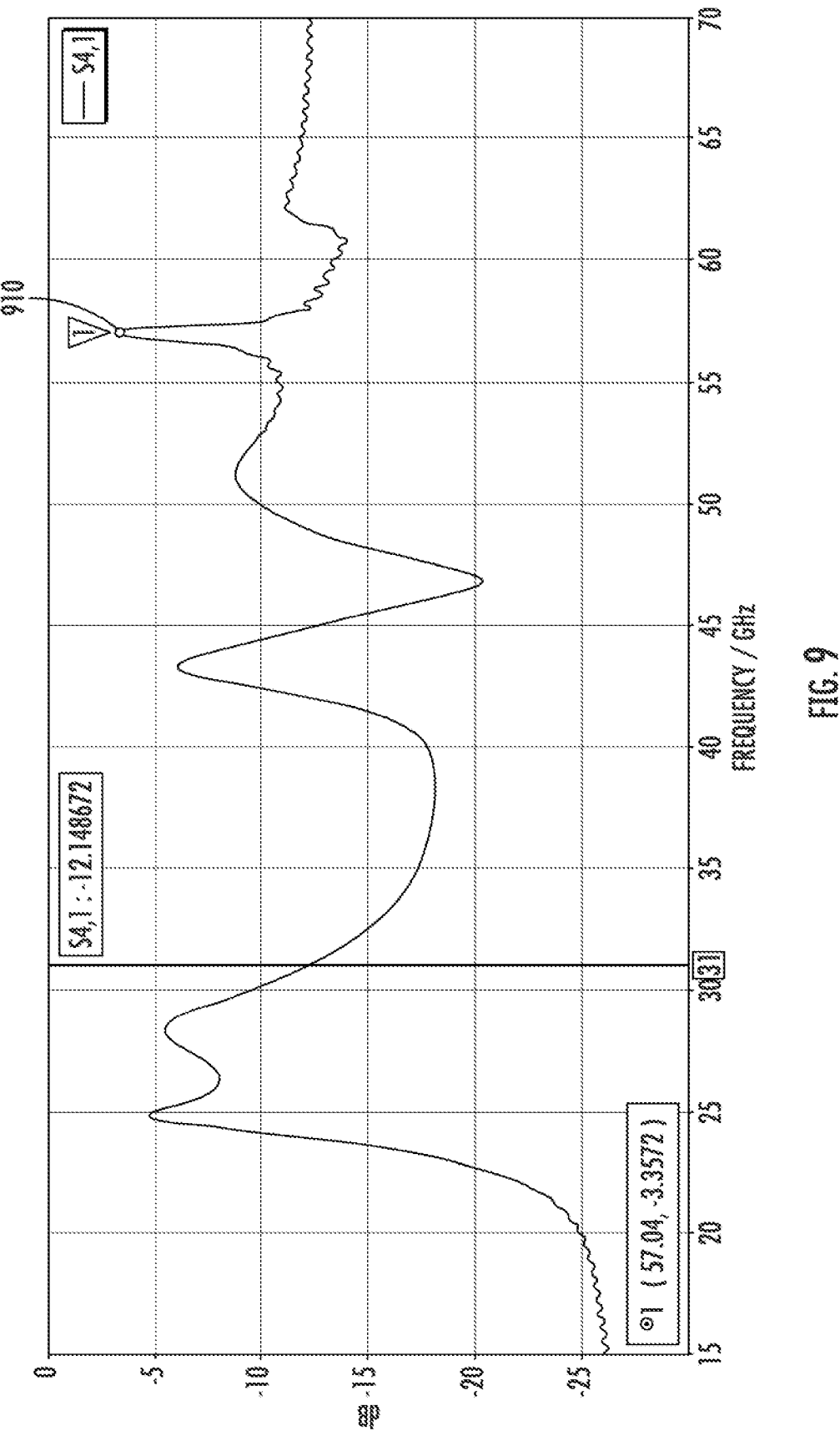
Figure 10:
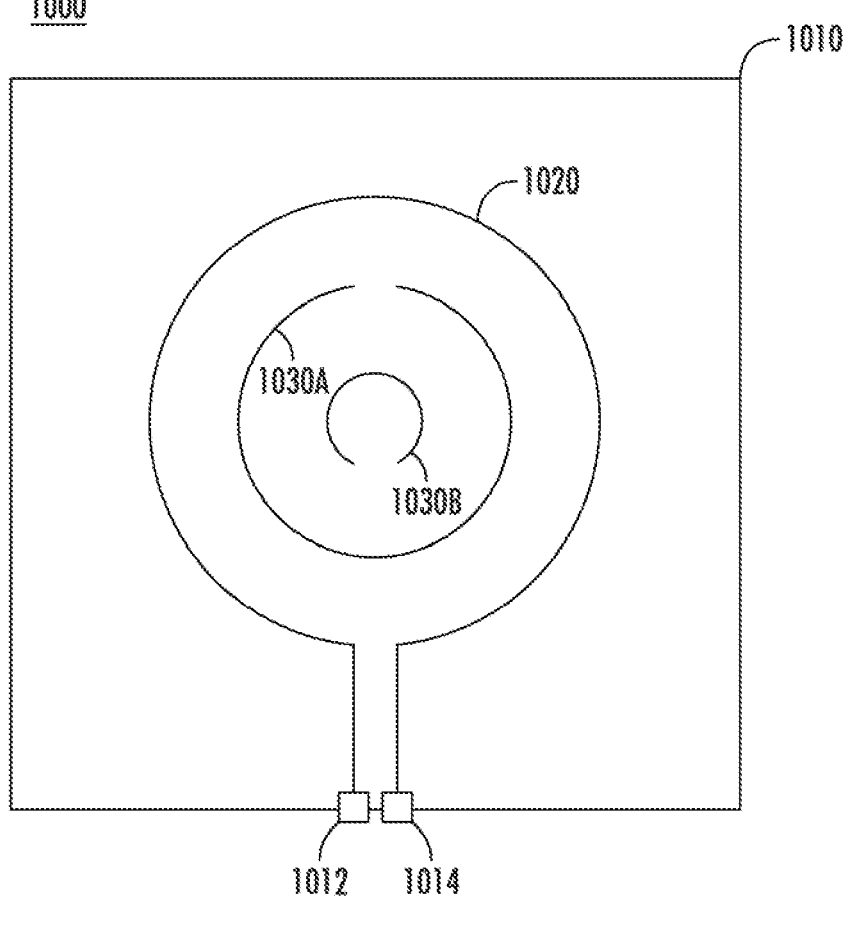
Figure 11:
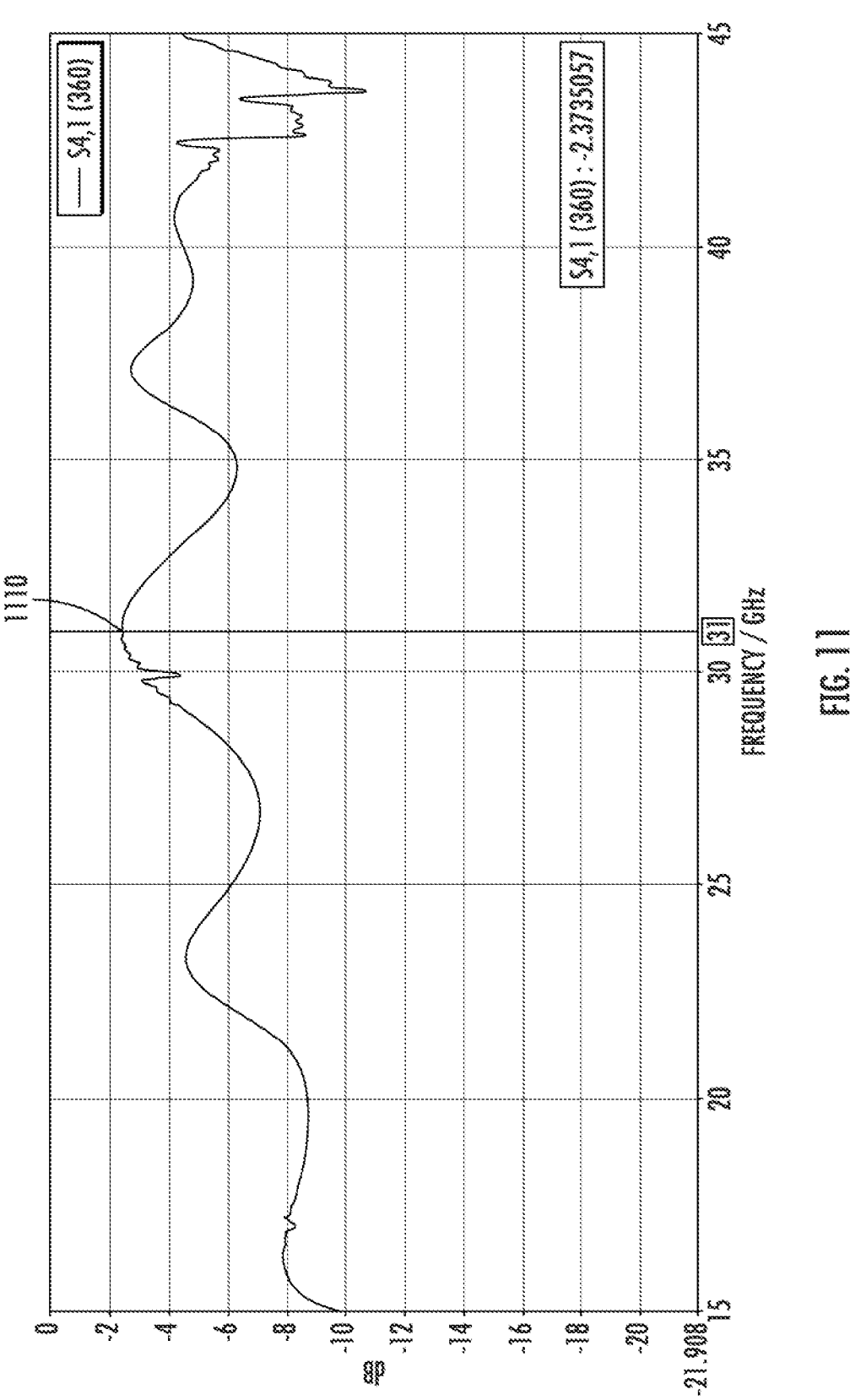
Figure 12:
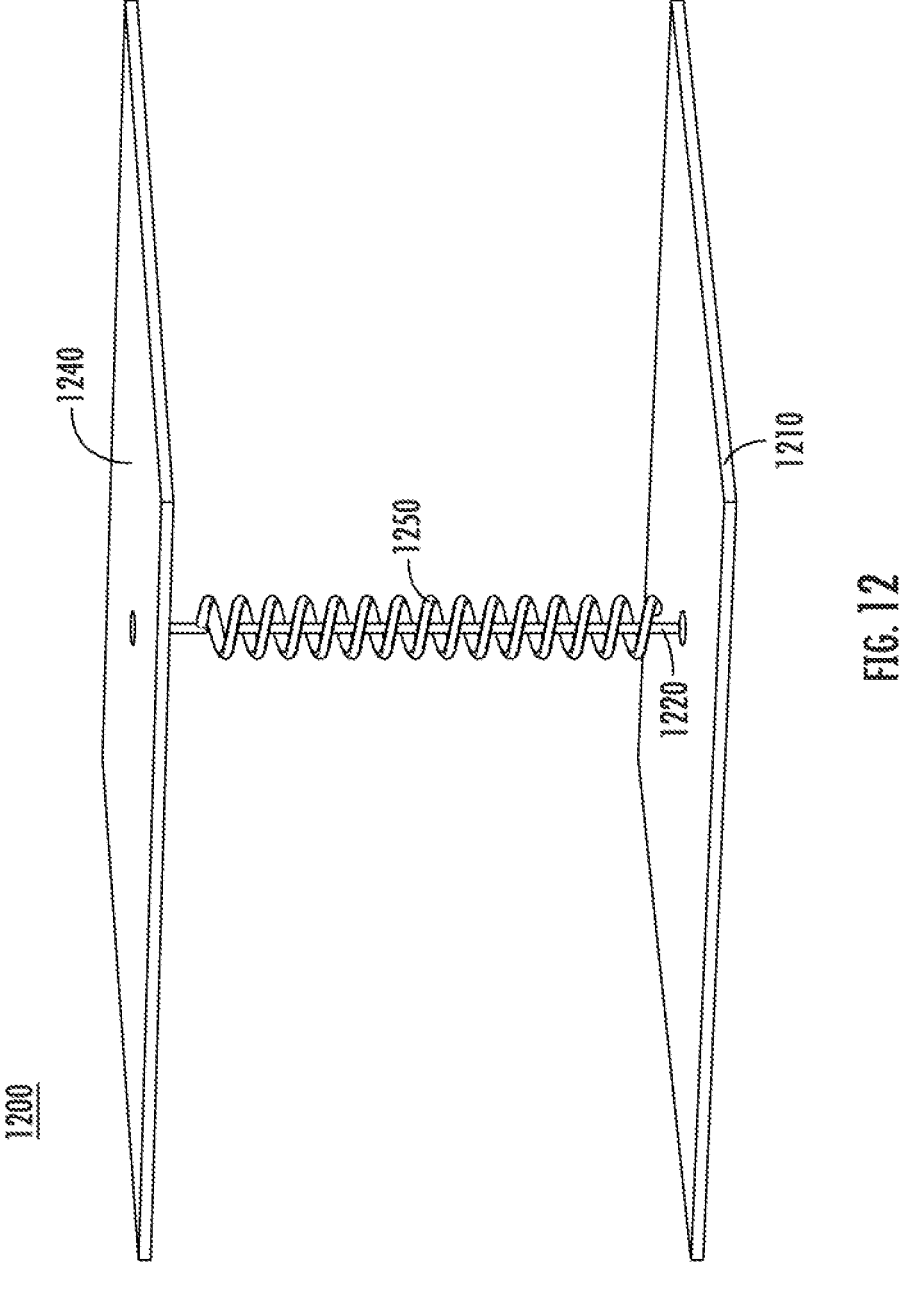
Figure 13:
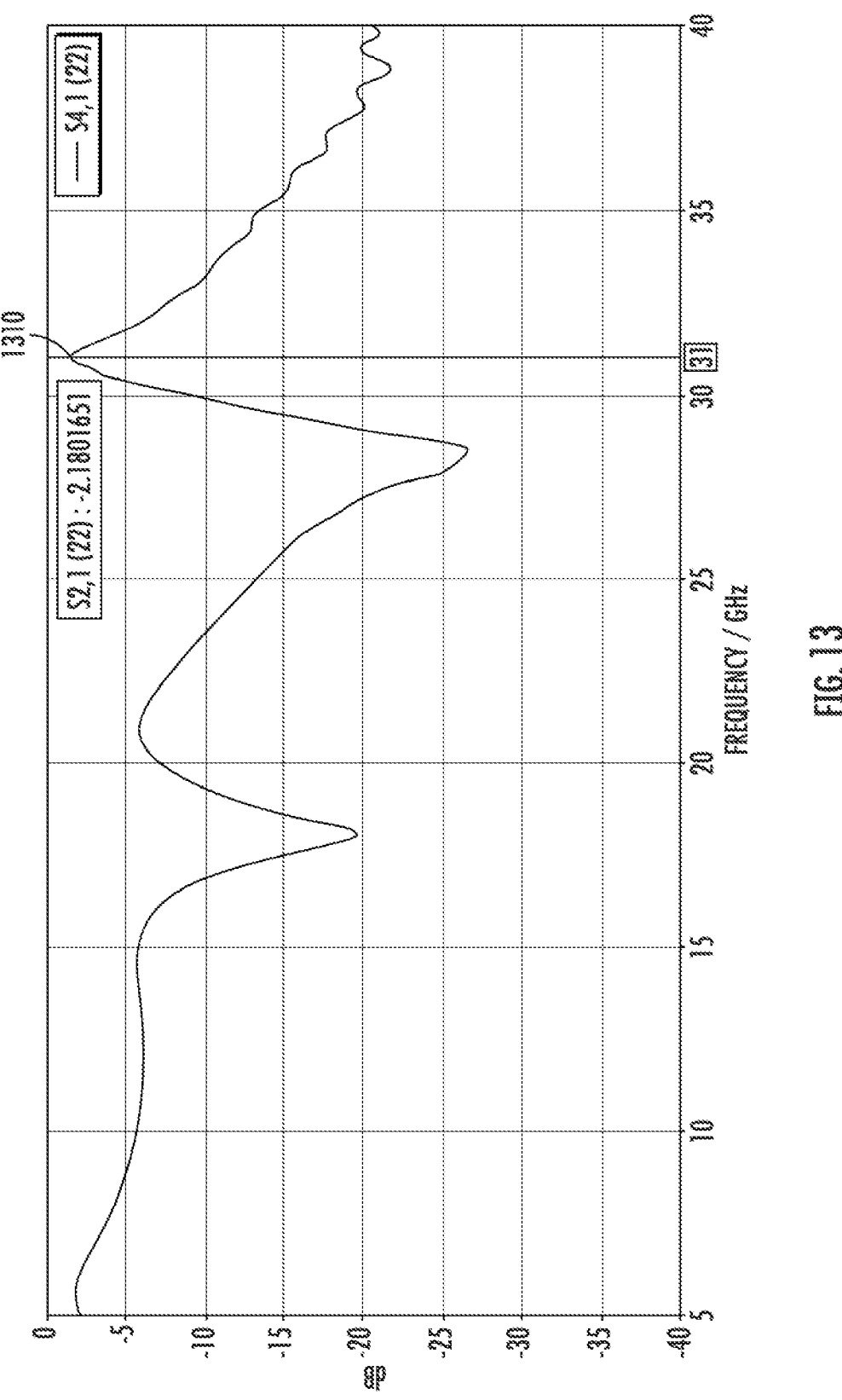
Figure 14:
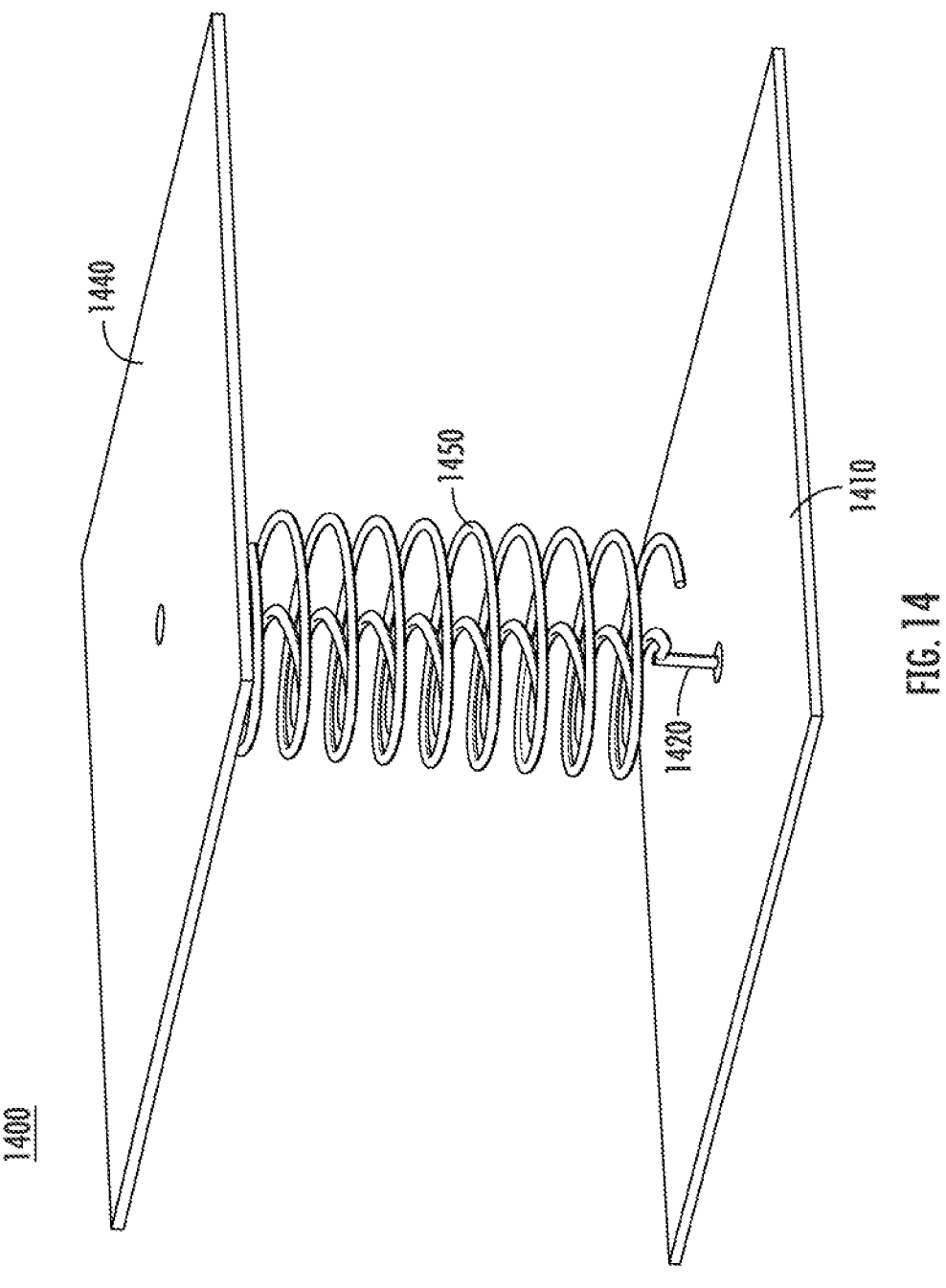
Figure 15:
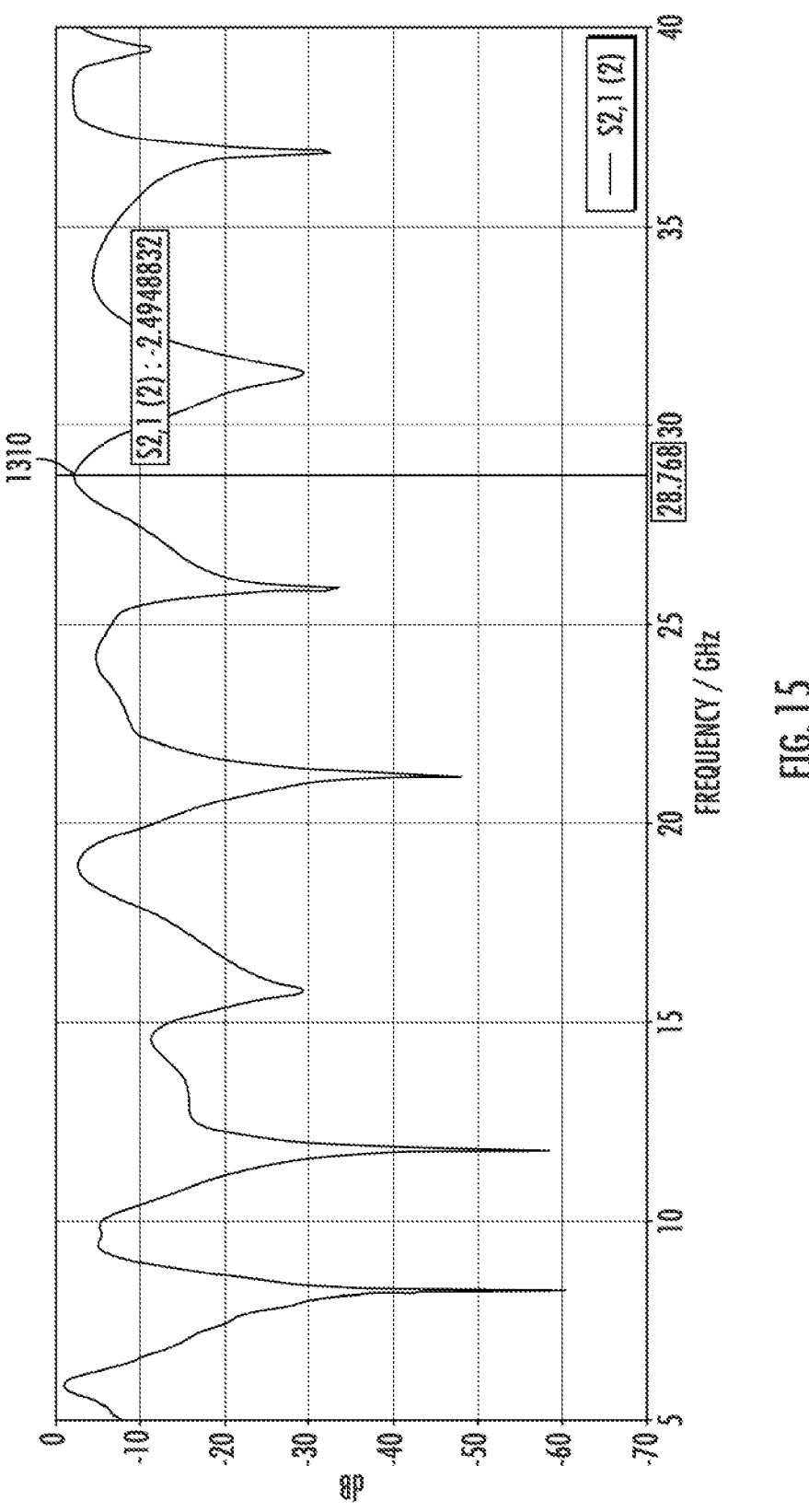
Figure 17:
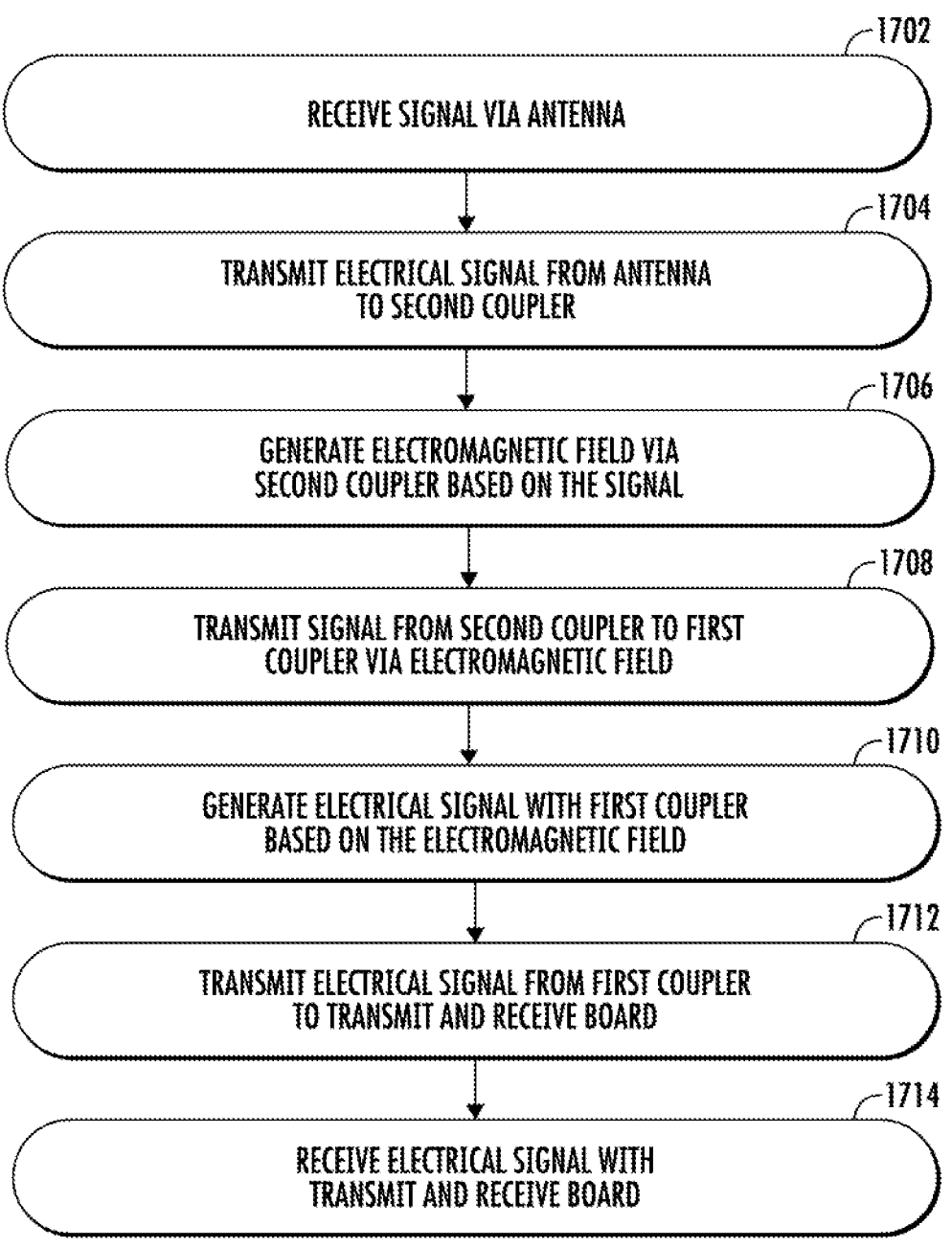
Figure 18:
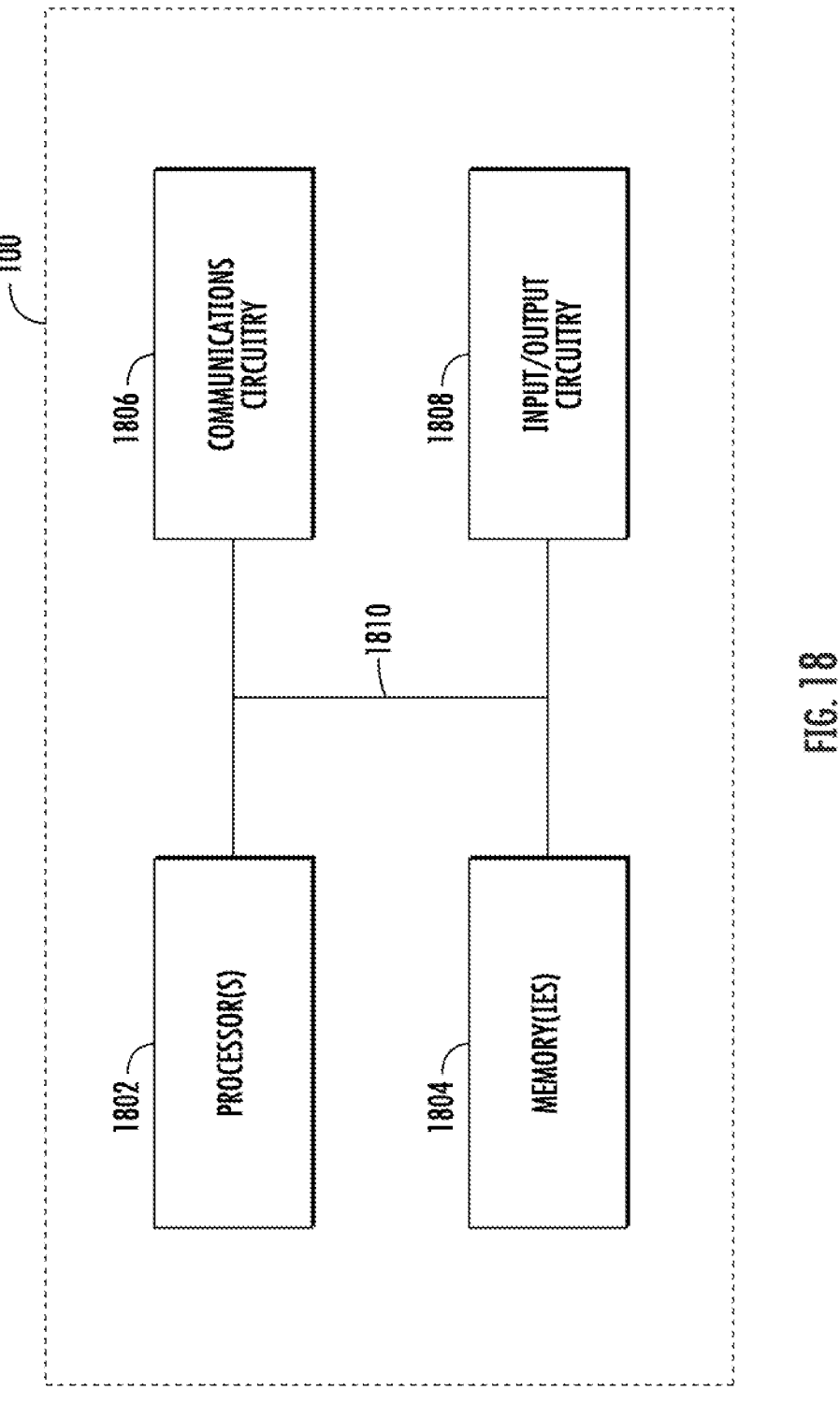

Having thus described certain example embodiments of the present disclosure in general terms, reference will now be made to the accompanying drawings, which are not necessarily drawn to scale, and wherein:

FIG. 1A illustrates an exemplary transmit/receive board in accordance with one or more embodiments of the present disclosure;

FIG. 1B illustrates a close up of an exemplary portion of a transmit/receive board in accordance with one or more embodiments of the present disclosure;

FIG. 2A illustrates a perspective view of an exemplary antenna in accordance with one or more embodiments of the present disclosure;

FIG. 2B illustrates a bottom view of an exemplary antenna in accordance with one or more embodiments of the present disclosure;

FIG. 2C illustrates a close up view of a portion of an exemplary antenna in accordance with one or more embodiments of the present disclosure;

FIG. 3A illustrates a block diagram of an exemplary first coupler and second coupler in accordance with one or more embodiments of the present disclosure;

FIG. 3B illustrates another block diagram of an exemplary first coupler and second coupler in accordance with one or more embodiments of the present disclosure;

FIG. 4 illustrates an exemplary near-field coupler in accordance with one or more embodiments of the present disclosure;

FIG. 5 illustrates an exemplary graph of S-parameters for an exemplary near-field coupler in accordance with one or more embodiments of the present disclosure;

FIG. 6 illustrates an exemplary spiral ring resonator coupler in accordance with one or more embodiments of the present disclosure;

FIG. 7 illustrates an exemplary graph of S-parameters for an exemplary spiral ring resonator coupler in accordance with one or more embodiments of the present disclosure;

FIG. 8 illustrates an exemplary strip line fed split ring resonator coupler in accordance with one or more embodiments of the present disclosure;

FIG. 9 illustrates an exemplary graph of S-parameters for an exemplary strip line fed split ring resonator coupler in accordance with one or more embodiments of the present disclosure;

FIG. 10 illustrates an exemplary split ring resonator coupler in accordance with one or more embodiments of the present disclosure;

FIG. 11 illustrates an exemplary graph of S-parameters for an exemplary split ring resonator coupler in accordance with one or more embodiments of the present disclosure;

FIG. 12 illustrates an exemplary monopole coupler in accordance with one or more embodiments of the present disclosure;

FIG. 13 illustrates an exemplary graph of S-parameters for an exemplary monopole coupler in accordance with one or more embodiments of the present disclosure;

FIG. 14 illustrates an exemplary helical coil coupler in accordance with one or more embodiments of the present disclosure;

FIG. 15 illustrates an exemplary graph of S-parameters for an exemplary helical coil coupler in accordance with one or more embodiments of the present disclosure;

FIG. 16 illustrates a flowchart that includes example methods for transmitting a signal in accordance with one or more embodiments of the present disclosure;

FIG. 17 illustrates a flowchart that includes example methods for receiving a signal in accordance with one or more embodiments of the present disclosure; and FIG. 18 illustrates an example block diagram of a transmit/receive board in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry.

Overview

Various embodiments of the present disclosure are directed to improved methods, systems, and apparatuses for transmit/receive boards and antennas that are mechanically isolated and electrically coupled via one or more couplers. Mechanically isolating and electrically coupling an antenna with a transmit/receive board allows for the transmit/receive board not to receive the mechanical stresses associated with directly connecting the antenna while being electrically coupled to the antenna.

As antennas become heavier, including for increasingly complex antennas of phased arrays, the distribution of the weight on electrical connections and/or electrical connectors causes mechanical and/or electrical failure of these electrical connections and/or electrical connectors. For example, electrical connections of solder balls are crushed, which degrades or destroys the electrical connection they otherwise provide.

As described herein, one or more couplers may be used to electrically couple a transmit/receive board to an antenna that are mechanically isolated. In various embodiments, such as an antenna of a phased array antenna with multiple antenna elements, each of the antenna elements may utilize its own coupler or pair of couplers. A coupler or pair of couplers utilize electromagnetic resonance to electrically couple a transmit/receive board to an antenna while mechanically isolating the transmit/receive board from the antenna. The coupling may be across an air gap and/or a substrate that may separate one or more portions of the couplers and/or transmit/receive board and antenna.

For example, a phased array antenna may electrically connect a plurality of antenna elements via a plurality of couplers to a plurality of electrical connections on a transmit/receive board. These electrical connections may allow for an electrical signal to be passed between the transmit/receive board and the respective antenna elements. The present disclosure, as described herein, may utilize one or more configurations of couplers.

In various embodiments, the response of a coupler or pair of couplers may be illustrated by graphing one or more S-parameters. The graph may have a vertical axis of decibels (dB) and the horizontal axis of frequency, such as GHz. Graphs described herein may illustrate the amount of power transfer from a transmit/receive board to an antenna element (or from an antenna element to a transmit/receive board) with the use of the electrical near-field coupling for a coupler or pair of couplers. Various graphs illustrating exemplary responses of various embodiments of couplers are described further herein.

It should be readily appreciated that the embodiments described herein may be configured in various additional and alternative manners in addition to those expressly described herein.

Exemplary Transmit/Receive Boards and Antennas

Various embodiments of the present disclosure include transmit/receive boards and antennas that are mechanically isolated and electrically coupled via one or more couplers. Various embodiments may include transmit/receive boards, antennas, and/or couplers as described herein.

FIG. 1A illustrates an exemplary transmit/receive board in accordance with one or more embodiments of the present disclosure. The transmit/receive board 100 may include a plurality of components, which are described herein. For example, a transmit/receive board 100 may include, among other things, a plurality of chips 110 and a plurality of signal pin pads 120. In various embodiments, a chip 110 may be a flip chip used in the transmitting and receiving of signals to and from an antenna. In various embodiments, a plurality of signal pin pads 120 may be associated with a chip 110. In the embodiment illustrated in FIG. 1, there are 16 chips 110. Each chip 110 is associated with four signal pin pads 120 that surround or are located near an associated chip 110.

FIG. 1B illustrates an exemplary portion of a transmit/receive board in accordance with one or more embodiments of the present disclosure. In particular, the exemplary portion of the transmit/receive board 100 illustrated in FIG. 1B is a portion associated with one chip 110A and four associated signal pin pads 120A, 120B, 120C, and 120D. Each of the signal pin pads 120 may include a plurality of solder connections. For example, and as illustrated, the signal pin pad 120A is associated with seven solder connections. In various embodiments, the center solder connection may be a center signal port. The center signal port may be an electrical port of a signal pin pad 120A that may conduct an electrical signal. The center signal port may also be electrically connected to one or more termination points of a coupler, which is described further herein.

In various embodiments, an apparatus and/or system that includes a transmit/receive board 100 may also include a mounting for an antenna that is not directly mounted to the transmit/receive board 100. Alternatively, in various embodiments an antenna may be directly connected to a transmit/receive board 100 but may not have direct electrical connections of the antenna to the transmit/receive board 100. For example, an antenna 200 may be mounted to mounting pads or at mounting locations on a transmit/receive board 100. As another example, an antenna 200 may be mounted to a surface of an apparatus or system containing the transmit/receive board 100. The mounting of the antenna 200 may be such that there is a gap between a first coupler and a second coupler, which is further described herein.

FIG. 2A illustrates a perspective view of an exemplary antenna in accordance with one or more embodiments of the present disclosure. In various embodiments, the antenna 200 may be an antenna array comprised of a plurality of antenna elements 210A. For example, FIG. 2A illustrates a 64 element antenna array. In various embodiments, this 64 element array may be a 64 element phased array antenna. In various embodiments, the antenna 200 may be 3D printed. For example, one or more structures incorporated into or associated with the antenna 200 may be 3D printed, including but not limited to one or more antenna elements. In another example, the antenna 200 may be a 3D printed phased array antenna.

In various embodiments of an antenna 200 of an antenna array, each antenna element 210 of the antenna array 200 may receive a separate electrical signal. Alternatively or additionally, one or more antenna elements 210 may receive the same electrical signal. The various electrical signals may be provided to each of the respective antenna elements 210 with a respective coupler and/or pair of couplers described herein.

In various embodiments, each of the antenna elements 210 may be configured to be resonant at a different frequency. Alternatively or additionally, one or more of the antenna elements 210 may be configured to resonate at the same frequency. The frequency an antenna element 210 is configured to resonate at may determines the electrical signal(s) that will be transmitted and/or received by the antenna element 210. Similarly, one or more of the couplers associated with an antenna element 210 may be configured to resonate at the same or a similar frequency as the antenna element 210. In various embodiments, a coupler or pair of couplers may be configured to resonate at a harmonic of an antenna element 210. Alternatively or additionally, an antenna element 210 may be configured to resonate at a harmonic of a coupler.

FIG. 2B illustrates a bottom view of an exemplary antenna in accordance with one or more embodiments of the present disclosure. In FIG. 2B, the bottom of antenna 200 includes a plurality of pairs of two termination ports 220 (e.g., 220A, 220B). For example, as illustrated in FIG. 2B, various embodiments may include 64 pairs of terminations ports 220. Each pair of termination ports 220 may be associated with one antenna element 210.

FIG. 2C illustrates a close up view of an exemplary antenna in accordance with one or more embodiments of the present disclosure. In FIG. 2C, a pair of termination ports 220A and 220B associated with an antenna element 210A are illustrated.

A pair of termination ports 220 (e.g., 220A, 220B) may be in the center of the bottom of each antenna element 210. In various embodiments, a first termination port 220A may be electrically connected to a coupler and a second termination port 220B may be electrically connected to a terminating resistor (not illustrated), such as with a 50 ohm resistor. The termination with the terminating resistor may reduce or eliminate reflections of the electrical signal. Such connections allow for a first termination port 220A to receive and/or transmit an electrical signal from or to a coupler.

In various embodiments not illustrated, an antenna 200 may include one or more amplifiers to boost an electrical signal. Additionally or alternatively, the transmit/receive board 100 may include one or more amplifiers to boost a transmitted and/or received electrical signal.

FIGS. 3A and 3B each illustrated expanded block diagrams of a first coupler and a second coupler. An interposer 300 may include a pair of couplers, including the first coupler 310 and the second coupler 320. The interposer 300 may be located between the transmit/receive board 100 and the antenna 200. The first coupler 310 may be mounted on a first structure 330, and the second coupler 320 may be mounted on a second structure 340. The first structure 330 and the second structure 340 may be, for example, a substrate that may allow for the mounting, printing, or attachment of a coupler. In an exemplary embodiment, a first structure 330 may be a printed circuit board (PCB) that a coupler 310 comprised of electrical traces printed on the PCB. The first structure 320 and the second structure 340 may be separated by a gap 350. In various embodiments, this gap 350 may be an air gap. Alternatively or additionally, the gap 350 may be or may include a dielectric.

The first coupler 310 may be electrically connected to the transmit/receive board 100 with an electrical connection 332. The second coupler 320 may be connect to an antenna 200 with an electrical connection 342. In various embodiments, while illustrated as being separated, the electrical connections 332, 342 may be solder connections. In various embodiments, the electrical connection 332, 342, may be made to the respective coupler 310, 320 by a termination port and/or through one or more vias in the respective first structure 330 or second structure 340.

In various embodiments, the first coupler 310 may include a first resonator and the second coupler 320 may include a second resonator. Examples of couplers and resonators are described further herein.

For example, the first coupler 310 may include a first resonator and the second coupler 320 may include a second resonator. The first resonator and the second resonator may resonate at the same, similar frequencies, and/or harmonics of these frequencies. By applying an electrical signal at a frequency to, for example, the first coupler 310 then the first resonator may resonate and generate an electromagnetic field that couples the first coupler 310 to the second coupler 320. The gap 350 between the first coupler 310 and second coupler 320 may of a distance that the first coupler 310 and the second coupler 320 are located in the near-field of the electromagnetic field generated by the other coupler. The electromagnetic field generated by the first resonator of the first coupler 310 may cause the second resonator of the second coupler 320 to resonate and, thus, generate an electrical signal. This coupling may allow for electrical signals to be transmitted and/or received between the first coupler 310 and the second coupler 320, and it may also allow for electrical signals to be transmitted and/or received between the second coupler 320 and the first coupler 310.

In various embodiments, and during signal transmission, the transmit/receive board 100 may generate and/or transmit an electrical signal to the first coupler 310. The first coupler 310 may be configured to resonate at the frequency of the electrical signal with a first resonator. The resonating of the first coupler 430 may generate an electromagnetic field. The second coupler 320 is located at a distance to be in the near-field of the resonating first coupler 310, which allows the second coupler 320 to receive the electrical signal via the electromagnetic field. The second coupler 320 may be configured to resonate at the frequency of the electrical signal and, thus, the electromagnetic field received at the second coupler 320 may cause the second coupler 320 to receive and/or generate a received electrical signal. This received electrical signal at the second coupler 320 may be transmitted to an antenna 200, including to an antenna element 210.

In various embodiments, and during receiving a signal at an antenna 200 or antenna element 210, the antenna 200 or antenna element 210 may be configured to receive a signal being transmitted by a remote source. The signal received from the remote source may cause the antenna 200 or antenna element 210 to generate a received electrical signal. This received electrical signal may be transmitted from the antenna 200 or antenna element 210 to a second coupler 320 associated with the antenna or antenna array 200. The second coupler 320, particularly a second resonator, may be configured to resonate at the frequency of the received signal. The resonating of the second coupler 320 may generate an electromagnetic field. The first coupler 310 is located at a distance to be in the near-field of the resonating second coupler 320. The first coupler 310 receives the electrical signal via the electromagnetic field. The first coupler 310 may be configured to resonate at the frequency of the electrical signal and, thus, the electromagnetic field received at the first coupler 310 may cause the first coupler 310 to generate and/or receive the electrical signal. This electrical signal at the first coupler 310 may be transmitted to the transmit/receive board 100.

As the distance of the gap 350 between the resonators of the couplers 310, 320 increases then less power will be transferred between the resonators by the coupling. A gap 350 between two resonators may be between one mill a plurality of millimeters. For example, an air gap may be 1 millimeter. As another example, the distance between the resonators on two structures may be 5 mils.

In various embodiments, a first coupler 310 and a second coupler 320 may be only one side of, respectively, a first structure 330 and a second structure 340. Alternatively, and in various embodiments, a first coupler 310 and a second coupler 320 may be only both sides of, respectively, a first structure 330 and a second structure 340.

FIG. 3A illustrates a block diagram of an exemplary first coupler and second coupler in accordance with one or more embodiments of the present disclosure. In the embodiment illustrated in FIG. 3A, the coupler 310 is on a first side of a first structure 330 and the second coupler 320 is on a first side of a second structure 340. As illustrated, the first coupler 310 and the second coupler 320 are directed or facing each other. Additionally, as illustrated the first coupler 310 and the second coupler 320 are only on one side of, respectively, the first structure 330 and the second structure 340.

FIG. 3B illustrates another block diagram of an exemplary first coupler and second coupler in accordance with one or more embodiments of the present disclosure. In the embodiment illustrated in FIG. 3B, the first coupler 310 may include a feed 312. The feed 312 may be on the second side of the structure 330 (e.g., illustrated as the bottom side of structure 330). The feed 312 be a feed line. Such a feed 312 on the second side of the first structure 330 may resonate at a frequency that couples the feed 312 of the first coupler 310 to a first resonator of the first coupler 310 on the first side of structure 330 (e.g., illustrated as the top side of the structure 330).

As also illustrated in FIG. 3B, the second coupler 320 may include a feed 322. The feed 322 may be on the second side of the structure 340 (e.g., illustrated as the top side of structure 340). The feed 322 may be a feed line. Such a feed 322 on the second side of the first structure 340 may resonate at a frequency that couples the feed 322 of the second coupler 320 to a resonator of the second coupler 320 on the first side of structure 340 (e.g., illustrated as the bottom side of the structure 340).

Exemplary Couplers

Embodiments of the present disclosure include transmit/receive boards 100 and antenna or antenna arrays 200 that are mechanically isolated and electrically coupled via one or more couplers (e.g., 310, 320). Various embodiments may include one or more couplers as described herein.

In various embodiments, couplers may be comprised of electrical traces on a structure (e.g., 330, 340). The electrical traces may be configured in patterns as described herein. Alternatively or additionally, a coupler or resonator may include an antenna (e.g., monopole antenna), a coil (e.g., helical *coli*), or another component as described herein. Couplers may also include one or more terminations ports.

FIGS. 4, 6, 8, 10, 12, and 14 illustrate multiple configurations of exemplary couplers. FIGS. 5, 7, 9, 11, 12, and 15 illustrate exemplary simulated responses the exemplary couplers may have in response to a signal generated and transmitted to the coupler.

FIG. 4 illustrates an exemplary near-field coupler in accordance with one or more embodiments of the present disclosure. In various embodiments, a first coupler 310 and a second coupler 320 may each be a near field coupler 400. A near-field coupler 400 may include an electrical trace 410 in a serpentine pattern on a first side 410 of a structure. The electrical trace 410 in the serpentine pattern may be a resonator. This resonator may be configured to resonate at a first resonant frequency. In various embodiments, there may be a first near-field coupler on a first structure 330 and a second near-field coupler on a second structure 340. Both of the first near-field coupler and the second near-field coupler may have the same or complementary serpentine patterns.

In various embodiments, and as illustrated in FIG. 4, the serpentine pattern may go back and forth from one side of a structure to another. 4. In various embodiments, a distance 424 may separate each row of the electrical trace 420. For example, a distance 424 may be 40 mils. The distance 424 between the rows of traces, the length 422 of the trace 420, and the overall length of the trace 420 may be configured such that the near-field coupler resonates at a first frequency. In various embodiments, the coupler may also resonate at harmonics of this first frequency. For example, and as illustrated in FIG. 4, an electrical trace 420 may go back and forth 11 times. In various embodiments, the overall length of the electrical trace 420 may be five to eight inches in length. The resonating frequency will be based on, among other things, the number of turns and times the electrical trace goes back and forth will.

In various embodiments, the configuration of the near-field coupler 400 may be such that as an electrical signal propagates along the length of the electrical trace 420 that the electromagnetic field generated along each row of length 422 causes constructive and destructive interference with the electromagnetic field generated by rows of other lengths 422 of the electrical trace 420. The overall electromagnetic field generated by the coupler may be utilized to transmit an electrical signal from a first near-field coupler (e.g., 310) to a second near-field coupler (e.g., 320).

In various embodiments, the near-field coupler 400 includes a first termination point 412 and a second termination point 414. Each termination point may be at an opposite end of the electrical trace 420. In various embodiments, the transmit/receive board 100 is electrically connected to one end of the electrical trace, such as at a termination port 412, and a terminating resistor is electrically connected to second termination port 414.

FIG. 5 illustrates an exemplary graph of S-parameters for an exemplary near-field coupler in accordance with one or more embodiments of the present disclosure. S-parameters are measured in relation to the termination ports and/or excitation ports of simulated or measured couplers. The S-parameters illustrated in the graphs herein utilize four termination ports: S1, S2, S3, and S4. S1 and S2 may refer to a first termination port and a second termination port of the first coupler (e.g., 310), and S3 and S4 may refer to a third termination port and a fourth termination port of the second coupler (e.g., 320). The graph illustrates a response of S4-to-S1 according to simulated measurements from these respective termination ports. In other words, the graph of FIG. 5 may illustrate the power of the signal transmitted from a transmit/receive board 100 as seen by an antenna 200 when being transmitted through a first near-field coupler 400 to a second near-field coupler 400.

As illustrated in FIG. 5, a pair of near-field electrical couplers 400 may resonate at multiple frequencies. In various embodiments, the pair of couplers may be configured to resonate at a single frequency with minimal losses. Alternatively or additionally, the pair of couplers may be configured to resonate at one or more frequencies with minimal losses. For example, and as illustrated in FIG. 5, one of these frequencies is at 31 GHz with losses of –3.1881 dB.

In the exemplary embodiments simulated for the graph illustrated in FIG. 5, the simulated response resonates at multiple frequencies, including at 30.971 GHz indicated at 510 and 37.109 GHz as indicated at 520. The power measurement at 510 is –3.1881 dB, and the power measurement at 520 is-3.5453 dB.

FIG. 6 illustrates an exemplary spiral ring resonator coupler in accordance with one or more embodiments of the present disclosure. In various embodiments, a spiral ring resonator coupler 600 may include a spiral ring 630. The spiral ring 630 may be an electrical trace on a structure 610 shaped as a spiral ring 630 with a decreasing radius spiral. The spiral ring 630 may be fed by an outer ring 620. The spiral ring 630 and the outer ring 620 are on the same plane, which may be due to both being on a same structure 610, such as a substrate or PCB. The outer ring 620 may be electrically connected to a plurality of termination ports 612, 614. The plurality of termination ports may include an input termination port 612 and an output termination port 614. In various embodiments, the input termination port 612 of the spiral ring resonator coupler 600 may be electrically connected to the transmit/receive board 100 and the output termination port 614 of the spiral ring resonator coupler 600 may be terminated to minimize or eliminate signal reflections. For example, the termination port 614 may be terminated with a terminating resistor, such as a 50 ohm resistor. In various embodiments, the electrical traces leading to the termination ports (e.g., 612, 614) may be separated by a gap. This gap may include a vacuum or dielectric.

In various embodiments, the outer ring 620 of each of the spiral ring resonator couplers acts as a feed loop that is magnetically coupled to the associated inner spiral 630. This coupling is with an electromagnetic field generated from a current of an electrical signal running through the outer ring 620. The inner spiral ring 620 is not electrically terminated or connected to anything and has a resonance based at least on the length of the inner spiral 630, the gap between the loops of the inner spiral 630, and the gap between the outer ring 620 and the inner spiral 630. Changes in these may lead to variations in capacitances and inductances that will define its resonant frequency of the spiral ring resonator coupler 600.

In various embodiments, a first spiral ring resonator coupler 600 and a second spiral ring resonator coupler 600 may be used to electrically couple a transmit/receive board 100 to an antenna 200. The outer ring 620 of the spiral ring resonator coupler 600 is coupled to the inner spiral 630. The inner spiral 630 of a first spiral ring resonator coupler 600 is coupled to a similar inner spiral of a second spiral ring resonator coupler (not illustrated). The inner spiral of the second spiral ring resonator coupler is coupled to an outer ring of the second spiral ring resonator coupler. The outer ring of the second spiral ring resonator coupler includes an input termination and an output termination similar to the first spiral ring resonator coupler, one of which may be connected to the antenna 200.

FIG. 7 illustrates an exemplary graph of S-parameters for an exemplary spiral ring resonator coupler in accordance with one or more embodiments of the present disclosure. For example, the graph of FIG. 7 may illustrate the power of the signal transmitted from a transmit/receive board 100 as seen by an antenna 200 when being transmitted through a first spiral ring resonator coupler 600 to a second spiral ring resonator coupler 600.

As illustrated in FIG. 7, a pair of spiral ring resonator couplers 600 may resonate at multiple frequencies. In various embodiments, the pair of couplers may be configured to resonate at a single frequency with minimal losses. Alternatively or additionally, the pair of couplers may be configured to resonate at one or more frequencies with minimal losses. For example, and as illustrated in FIG. 7, one of these frequencies is at or near 31 GHz. In particular, the simulated response resonates at 30.742 GHz indicated at 710 with a power measurement of −2.7195 dB.

FIG. 8 illustrates an exemplary strip line fed split ring resonator coupler in accordance with one or more embodiments of the present disclosure. A strip line fed split ring resonator coupler 800 may include electrical traces 830 on a first side 810A of a structure 810 and electrical traces 820 on a second side 810B of a structure 810. The second side 810B may include a strip line 820. The strip line 820 may include a first termination port 812 and a second termination port 814. The first termination port 812 may be electrically connected to the transmit/receive board 100 and the second termination port 814 may be terminated with a termination resistor that may minimize or eliminate reflections, such as a 50 ohm resistor. The first side of the structure 810A may include a plurality of split ring resonators 830. In various embodiments, and as illustrated in FIG. 8, the plurality of split ring resonators 830 may include a first split ring 830A and a second split ring 830B. Each of the split rings 830 may include a gap. The strip line 820 couples with an electromagnetic field to the split rings 830 through the structure 810. The structure 810 may be made of a dielectric to allow for electrically coupling between the strip line 820 and the split rings 830. In various embodiments with multiple strip line fed split ring resonator couplers 800, such as one associated with each of an plurality of antenna elements, a single strip line 810 may be used to feed the plurality of split rings 830.

While FIG. 8 illustrates two split rings 830, various embodiments may use other shapes, such as squares. Additionally or alternatively, there may be more than two split rings 630, such as there being three, four, five, or more split rings 630. The additional split rings 630 may be configured in a repeating pattern. For example, a repeating pattern may include the gaps of each of the split rings 630 alternating from, as illustrated, a top side and a bottom side of the structure 810. The resonance of the split ring resonators 630 is based on, among other things, the spacing between split rings 630 and the shape of the split rings 630, such as the diameter of each split 630 ring, and the gap in each of the split rings. Variations in configurations may determine one or more capacitances between other split rings 630 and also the resonant frequency (ies).

In various embodiments, a first coupler 310 may be comprised of a first strip line fed split ring resonator coupler 800 and a second coupler 320 may be comprised of a second strip line fed split ring resonator coupler 800. These first coupler 310 and second coupler 320 may be electrically connected by an electromagnetic field generated by an electrical signal provided to one of the couplers 310 or 320.

FIG. 9 illustrates an exemplary graph of S-parameters for an exemplary strip line fed split ring resonator coupler in accordance with one or more embodiments of the present disclosure. For example, the graph of FIG. 9 may illustrate the power of the signal transmitted from a transmit/receive board 100 as seen by an antenna 200 when being transmitted through a first strip line fed split ring resonator coupler 800 to a second strip line fed split ring resonator coupler 800.

As illustrated in FIG. 9, a pair of strip line fed split ring resonator couplers 800 may resonate at multiple frequencies. In various embodiments, the pair of strip line fed split ring resonator couplers 800 may be configured to resonate at a single frequency with minimal losses. Alternatively or additionally, the pair of strip line fed split ring resonator couplers 800 may be configured to resonate at one or more frequencies with minimal losses. For example, and as illustrated in FIG. 9, one of these frequencies is at or near 57 GHz. In particular, the simulated response resonates at 57.04 GHz indicated at 910 with a power measurement of −3.3572 dB.

FIG. 10 illustrates an exemplary split ring resonator coupler in accordance with one or more embodiments of the present disclosure. The split ring resonator coupler 1000 may be comprised of multiple split rings 1030 fed by an outer ring 1020. The outer ring 1020 may be electrically connected to a first termination port 1012 and a second termination port 1014. The first termination port 1012 may be electrically connected to the transmit/receive board 100, and the second termination port 1014 may be terminated with a termination resistor that may minimize or eliminate reflections, such as a 50 ohm resistor. The split rings 1030 are similar to those of the strip line fed split ring resonator coupler 800, and they may include the same variations described herein.

In various embodiments, the split ring resonator coupler 1000 may resonate at 3 times the wavelength or 3 Lambda. In various embodiments, a reduction in the gap size may cause a sharper rise or sharper fall in a response.

In various embodiments, a first coupler 310 may be comprised of a first split ring resonator coupler 1000 and a second coupler 320 may be comprised of a second split ring resonator coupler 1000. These first coupler 310 and second coupler 320 may be electrically connected by an electromagnetic field generated by an electrical signal provided to one of the couplers 310 or 320.

FIG. 11 illustrates an exemplary graph of S-parameters for an exemplary split ring resonator coupler in accordance with one or more embodiments of the present disclosure. For example, the graph of FIG. 11 may illustrate the power of the signal transmitted from a transmit/receive board 100 as seen by an antenna 200 when being transmitted through a first split ring resonator coupler 1000 to a second split ring resonator coupler 1000.

As illustrated in FIG. 11, a pair of split ring resonator couplers 1000 may resonate at multiple frequencies. In various embodiments, the pair of couplers may be configured to resonate at a single frequency with minimal losses. Alternatively or additionally, the pair of couplers may be configured to resonate at one or more frequencies with minimal losses. For example, and as illustrated in FIG. 11, one of these frequencies is at or near 31 GHz. In particular, the simulated response resonates at 31 GHz indicated at 1110 with a power measurement of –2.3735 dB.

FIG. 12 illustrates an exemplary monopole coupler in accordance with one or more embodiments of the present disclosure. The monopole coupler 1200 may include a first structure 1210 with a monopole 1220 and a second structure 1240 with a helical coil 1250. The monopole 1220 may be configured to located inside or extending inside of the helical coil 1250. Thus, the helical coil 1250 may surround the monopole 1220. The monopole 1220 may be configured to resonate at a first frequency. The helical coil 1250 may also be configured to resonate at the first frequency. Though not illustrated, the monopole 1220 may be electrically connected to one or more electrical traces on the first surface 1210. The electrical traces may be terminated in one or more termination ports. A first termination port may be electrically connected to a transmit/receive board 100 and a second termination port may be terminated with a termination resistor that may minimize or eliminate reflections, such as a 50 ohm resistor. Also not illustrated, the helical coil 1250 may be electrically connected to one or more electrical traces on the second surface 1240. The electrical traces on the second surface 1240 may be terminated at a first termination port and a second termination port. One of these termination ports of the second surface 1240 may be electrically connected to an antenna 200 and the second termination port may be terminated with a termination resistor that may minimize or eliminate reflections, such as a 50 ohm resistor.

An electromagnetic field generated by an electrical signal applied to the monopole 1220 may couple the monopole 1220 to the helical coil 1250. Thus an electrical signal may be transmitted from the monopole 1120 to the helical coil 1250. Additionally or alternatively, an electromagnetic field generated by an electrical signal applied to the helical coil 1250 may couple the helical coil 1250 to the monopole 1220. Thus an electrical signal may be transmitted from the helical coil 1250 to the monopole 1220.

FIG. 13 illustrates an exemplary graph of S-parameters for an exemplary monopole coupler in accordance with one or more embodiments of the present disclosure. For example, the graph of FIG. 13 may illustrate the power of the signal transmitted from a transmit/receive board 100 as seen by an antenna 200 when being transmitted through a monopole coupler 1200.

As illustrated in FIG. 13, a monopole coupler 1200 may resonate at multiple frequencies. In various embodiments, the monopole coupler 1200 may be configured to resonate at a single frequency with minimal losses. Alternatively or additionally, the monopole coupler 1200 may be configured to resonate at one or more frequencies with minimal losses. For example, and as illustrated in FIG. 13, one of these frequencies is at or near 31 GHz. In particular, the simulated response resonates at 31 GHz indicated at 1310 with a power measurement of –2.18 dB.

FIG. 14 illustrates an exemplary helical coil coupler in accordance with one or more embodiments of the present disclosure. The helical coupler 1400 may include a first structure 1410 with a first helical coil 1420 and a second structure 1440 with a second helical coil 1450. The first helical coil 1420 may be configured to be located inside or extending inside of the second helical coil 1450. Thus, the second helical coil 1450 may surround the first helical coil 1420. In various embodiments, the direction of the first helical coil 1420 may go in the same direction as the second helical coil 1450 (e.g., both going clockwise). Alternatively, the direction of the first helical coil 1420 may go in the opposite direction of the second helical coil 1450 (e.g., respectively, clockwise and counterclockwise). In various embodiments, the angle of elevation of each of the helical coils 1420, 1450 may be same. For example, and going in one direction, each of the helical coils 1420, 1450 may have the same number of turns and/or rotations at the same or similar spacing. Alternatively, in various embodiments, the angle of elevation may different such that one helical coil has a greater number of turns. Alternatively or additionally, the angle of elevation and spacing may change over the length of each of the helical coils 1420, 1450. The first helical coil 1420 may be configured to resonate at least a first frequency and the second helical coil 1450 may also be configured to resonate at least at the first frequency.

Though not illustrated, the first helical coil 1420 may be electrically connected to one or more electrical traces on the first surface 1410. The electrical traces may be terminated in one or more termination ports. A first termination port may be electrically connected to a transmit/receive board 100 and a second termination port may be terminated with a termination resistor that may minimize or eliminate reflections, such as a 50 ohm resistor. Also not illustrated, the second helical coil 1450 may be electrically connected to one or more electrical traces on the second surface 1440. The electrical traces may be terminated in one or more termination ports. One of these termination ports of the second surface 1240 may be electrically connected to an antenna 200 and the second termination port may be terminated with a termination resistor that may minimize or eliminate reflections, such as a 50 ohm resistor.

An electromagnetic field generated by an electrical signal applied to the first helical coil 1420 may couple the first helical coil 1420 to the second helical coil 1450. Thus an electrical signal may be transmitted from the first helical coil 1420 to the second helical coil 1450. Additionally or alternatively, an electromagnetic field generated by an electrical signal applied to the second helical coil 1450 may couple the second helical coil 1450 to the first helical coil 1420. Thus an electrical signal may be transmitted from the second helical coil 1450 to the first helical coil 1420.

FIG. 15 illustrates an exemplary graph of S-parameters for an exemplary helical coil coupler in accordance with one or more embodiments of the present disclosure. For example, the graph of FIG. 15 may illustrate the power of the signal transmitted from a transmit/receive board 100 as seen by an antenna 200 when being transmitted through a helical coil coupler 1400.

As illustrated in FIG. 15, a helical coil coupler 1400 may resonate at multiple frequencies. In various embodiments, the helical coil coupler 1400 may be configured to resonate at a single frequency with minimal losses. Alternatively or additionally, the helical coil coupler 1400 may be configured to resonate at one or more frequencies with minimal losses. For example, and as illustrated in FIG. 15, one of these frequencies is at or near 29 GHz. In particular, the simulated response resonates at 28.765 GHz indicated at 1510 with a power measurement of −2.4948 dB.

Having generally described exemplary embodiments in accordance with the present disclosure, several exemplary operations according to exemplary embodiments will be described.

Exemplary Operations

In some example embodiments, and according to the operations described herein, an transmit/receive board 100 is mechanically isolated and electrically coupled to an antenna 200, both of which may be operated to transmit and/or receive signals. While the following flowcharts and related descriptions include multiple operations, it is readily appreciated that some of the following operations may be omitted, some of the operations may be repeated or iterated, and that additional operations may be included. Additionally, the order of operations should not be interpreted as limiting as the order of these operations may be varied.

FIG. 16 illustrates a flowchart that includes example methods for transmitting a signal in accordance with one or more embodiments of the present disclosure. In various embodiments, an electrical signal at a first frequency will be generated by the transmit/receive board 100 and transmitted to the antenna 200 or an antenna element 210 of antenna 200 for transmission. The electrical signal may be transmitted to the antenna 200 or an antenna element 210 of an antenna 200 through a coupler or pair of couplers that are electrically coupled by an electromagnetic field.

At operation 1602, a signal may be generated on the transmit/receive board. The transmit/receive board 100 may generate an electrical signal for transmission. In various embodiments, the transmit/receive board 100 may generate a separate electrical signal for each antenna element 210 of an antenna array 200. In such embodiments, the separate electrical signals may be in phase, out of phase, or a mixture of in phase and out of phase. Additionally or alternatively, the amplitude of each electrical signal may the same, the amplitude of each electrical signal may be different, or the amplitudes of a plurality of electrical signals may be a mixture with some amplitudes being the same and some being different.

At operation 1604, a signal may be transmitted from the transmit/receive board to a first coupler. The electrical signal may be transmitted from the transmit/receive board 100 to a first coupler, such as by an electrical connection 332. In various embodiments, the electrical signal may be transmitted by a signal pad 120 to the electrical connection 332 and then to a first termination port of the first coupler 310.

At operation 1606, an electromagnetic field may be generated by the first coupler based on the signal. The electrical signal may be received by the first coupler 310 at a first termination port and propagate the length of an electrical trace, a monopole, a helical coil, or a combination thereof. As the electrical signal propagates over the length of the first coupler 310 an electromagnetic field is generated based on the electrical signal.

At operation 1608, the signal may be transmitted from the first coupler to the second coupler via coupling of the electromagnetic field. The second coupler 320 may be positioned at a distance from the first coupler 310 such that the electromagnetic field generated by first coupler 310 couples the first coupler 310 and the second coupler 320. This coupling may transmit the electrical signal from the first coupler 310 to the second coupler 320.

At operation 1610, a signal may be generated with the second coupler based on the electromagnetic field. In various embodiments, the electromagnetic field generated by the first coupler 310 will induce a current in the electrical trace(s), monopole, helical coil, or combination thereof in the second coupler 320. The induced current will be the transmitted electrical signal. In various embodiments, the electrical signal generated in the second coupler 320 may have a lower power, such as due to losses in the transmission of the electrical signal from the first coupler 310 to the second coupler 320.

At operation 1612, the signal may be transmitted from the second coupler to an antenna. The electrical signal generated in the second coupler 320 may be transmitted to an antenna 200 or antenna element 210. The electrical signal may be transmitted from a termination point of the second coupler 320 and by an electrical connection 342 to the antenna 200 or an antenna element 210.

At operation 1614, the antenna may transmit the signal. The antenna 200 or antenna element 210, having received the electrical signal, may transmit the electrical signal. The transmission by the antenna 200 or antenna element 210 may be based on the frequency of the electrical signal received from the second coupler 320.

FIG. 17 illustrates a flowchart that includes example methods for receiving a signal in accordance with one or more embodiments of the present disclosure.

At operation 1702, an antenna may receive a signal. An electrical signal at a first frequency may be received from a remote source or a reflection from a remote object. The electrical signal may be received at the antenna 200 or an antenna element 210, which may cause the antenna 200 or antenna element 210 to resonate. The resonance may generate an electrical signal.

At operation 1704, the antenna may transmit a signal to a second coupler. The electrical signal may be transmitted from the antenna 200 to a first coupler, such as by an electrical connection 342. The electrical signal may be transmitted from an electrical connection 342 to the antenna 200 or an antenna element 210 and received by a termination point of the second coupler 320.

At operation 1706, an electromagnetic field may be generated by the second coupler based on the signal. The electrical signal may be received by the second coupler 320 at a first termination port and propagate the length of an electrical trace, a monopole, a helical coil, or a combination thereof. As the electrical signal propagates over the length of the first coupler 320 an electromagnetic field is generated based on the electrical signal.

At operation 1708, the signal may be transmitted from the second coupler to the first coupler via coupling of the electromagnetic field. The second coupler 320 may be positioned at a distance from the first coupler 310 such that the electromagnetic field generated by second coupler 320 couples the first coupler 310 and the second coupler 320. This coupling may transmit the electrical signal from the second coupler 320 to the first coupler 310.

At operation 1710, a signal may be generated with the first coupler based on the electromagnetic field. In various embodiments, the electromagnetic field generated by the second coupler 320 will induce a current in the electrical trace(s), monopole, helical coil, or combination thereof in the first coupler 310. The induced current will be the transmitted electrical signal. In various embodiments, the electrical signal generated in the first coupler 310 may have a lower power, such as due to losses in the transmission of the electrical signal from the second coupler 320 to the first coupler 310.

At operation 1712, the signal may be transmitted from the first coupler to a transmit/receive board. The electrical signal generated in the first coupler 310 may be transmitted to a transmit/receive board 100. The electrical signal may be transmitted from a termination point of the first coupler 310 and by an electrical connection 332 to the transmit/receive board 100.

At operation 1714, transmit/receive board 100 may receive the signal. The transmit/receive board 100, having received the electrical signal, may process the electrical signal to determine one or more pieces of information contained in or represented by the electrical signal.

The above operations describe a first coupler and a second coupler. It will readily be appreciated that the description of a first coupler and a second coupler equally applies to the monopole coupler 1200 and the helical coil coupler 1400. For example for a monopole coupler 1200, the monopole 1220 may be the first coupler and the helical coil 1250 may be the second coupler as described in the operations above. For example for a helical coil coupler, the first helical coil 1420 may be the first coupler and the second helical coil 1450 may be the second coupler as described in the operations above.

Exemplary Apparatuses and Systems

FIG. 18 illustrates an example block diagram of a transmit/receive board 100 in accordance with one or more embodiments of the present disclosure. The transmit/receive board 100 may include a processor 1802, memory 1804, communications circuitry 1806, and input/output circuitry 1808, which may all be connected via a bus 1812.

The processor 1802, although illustrated as a single block, may be comprised of a plurality of components and/or processor circuitry. The processor 1802 may be implemented as, for example, various components comprising one or a plurality of die, flip chips, microprocessors, processing circuits; and various other processing elements. The processor 1802 may include integrated circuits, such as ASICs, FPGAs, systems-on-a-chip (SoC), or combinations thereof. In various embodiments, the processor 1802 may be configured to execute operations, instructions, applications, and/or programs stored in the processor 1802, memory 1804, or otherwise accessible to the processor 1802. When executed by the processor 1802, these operations, instructions, applications, and/or programs may enable the execution of one or a plurality of the operations and/or functions described herein. Regardless of whether a processor 1802 is configured by hardware, firmware/software methods, or a combination thereof, the processor 1802 may comprise entities capable of executing operations and/or functions according to the embodiments of the present disclosure when correspondingly configured.

The memory 1804 may comprise, for example, a volatile memory, a non-volatile memory, or a certain combination thereof. Although illustrated as a single block, the memory 1804 may comprise a plurality of memory components. In various embodiments, the memory 1804 may comprise, for example, a cache memory, random access memory, a flash memory, a hard disk, a circuit configured to store information, or a combination thereof. The memory 1804 may be configured to write or store data, information, application programs, instructions, etc. so that the processor 1802 may execute various operations and/or functions according to the embodiments of the present disclosure. Additionally or alternatively, in at least some embodiments, the memory 1804 may be configured to store program instructions for execution by the processor 1802. The memory 1804 may store information in the form of static and/or dynamic information. When the operations and/or functions are executed, the stored information may be stored and/or used by the processor 1802.

The communication circuitry 1806 may be implemented as any apparatus included in a circuit, hardware, computer program product, or a combination thereof, which is configured to receive and/or transmit data from/to another component or apparatus. The computer program product may comprise computer-readable program instructions stored on a computer-readable medium (e.g., memory 1804) and executed by a processor 1802. In various embodiments, the communication circuitry 1806 (as with other components discussed herein) may be at least partially implemented as part of the processor 1802 or otherwise controlled by the processor 1802. The communication circuitry 1806 may communicate with the processor 1802, for example, through a bus 1810. Such a bus may connect to the processor 1802, and it may also connect to one or more other components. The communication circuitry may be comprised of, for example, transmitters, receivers, transceivers, network interface cards and/or supporting hardware and/or firmware/software, and may be used for establishing communication with another component(s), apparatus(es), and/or system(s). The communication circuitry 1806 may be configured to receive and/or transmit data that may be stored by, for example, the memory 1804 by using one or more protocols that can be used for communication between components, apparatuses, and/or systems.

In various embodiments, the communication circuitry 1806 may convert, transform, and/or package data into data packets and/or data objects to be transmitted and/or convert, transform, and/or unpackage data received, such as from a first protocol to a second protocol, from a first data type to a second data type, from an analog signal to a digital signal, from a digital signal to an analog signal, or the like. The communication circuitry 1806 may additionally, or alternatively, communicate with the memory 1804, the input/output circuitry 1808, and/or any other component of the processor 1802, such as through a bus 1810.

The input/output circuitry 1808 may communicate with the processor 1802 to receive instructions input by an operator and/or to provide outputs to an operator, which may be through one or more other portions of an apparatus or system. The input/output circuitry 1808 may comprise one or more interfaces to which one or more other portions of an apparatus or system or supporting devices may be connected. In various embodiments, aspects of the input/output circuitry 1808 may be implemented on a device used by the operator to communicate with the processor 1802. The input/output circuitry 1808 may communicate with the memory 1804, the communication circuitry 1806, and/or any other component, for example, through a bus 1810.

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

The invention claimed is:

1. A mechanically isolated and electrically coupled transmission apparatus comprising:
   an antenna comprising at least one antenna element;
   a transmit/receive board comprising at least one signal pin pad, wherein the at least one signal pin pad is associated with the at least one antenna element;
   a first structure associated with the transmit/receive board and associated with a first coupler, wherein the first coupler is electrically connected to the at least one signal pin pad;
   a second structure associated with the antenna and associated with a second coupler, wherein the second coupler is electrically connected to the at least one antenna element; and
   wherein the first structure and the second structure are mechanically isolated and electrically coupled via the first coupler and the second coupler.

2. The mechanically isolated and electrically coupled transmission apparatus of claim 1, wherein the first coupler comprises a first trace in a first serpentine pattern with at least a first resonant frequency of the first trace at a first frequency, and wherein the second coupler comprises a second trace in a second serpentine pattern with at least a first resonant frequency of the second trace at the first frequency.

3. The mechanically isolated and electrically coupled transmission apparatus of claim 1, wherein the first coupler comprises a first spiral ring resonator with at least a first resonant frequency of the first spiral ring resonator at a first frequency, and wherein the second coupler comprises a second spiral ring resonator with at least a first resonant frequency of the second spiral ring resonator at the first frequency.

4. The mechanically isolated and electrically coupled transmission apparatus of claim 1, wherein the first coupler comprises a first split ring resonator with at least a first resonant frequency of the first split ring resonator at first frequency, and wherein the second coupler comprises a second split ring resonator with at least a first resonant frequency of the second split ring resonator at the first frequency.

5. The mechanically isolated and electrically coupled transmission apparatus of claim 1, wherein the first coupler comprises a monopole antenna with at least a first resonant frequency of the monopole antenna at first frequency, and wherein the second coupler comprises helical coil with at least a first resonant frequency of the helical coil at the first frequency.

6. The mechanically isolated and electrically coupled transmission apparatus of claim 1, wherein the first coupler comprises a first helical coil with at least a first resonant frequency of the first helical coil at first frequency, and wherein the second coupler comprises a second helical coil with at least a first resonant frequency of the second helical coil at the first frequency.

7. The mechanically isolated and electrically coupled transmission apparatus of claim 1, wherein the antenna comprises one or more 3D printed structures.

8. A method of transmitting a signal comprising:
   providing a mechanically isolated and electrically coupled transmission apparatus comprising:
      an antenna comprising at least one antenna element;
      a transmit/receive board comprising at least one signal pin pad, wherein the at least one signal pin pad is associated with the at least one antenna element;
      a first structure associated with the transmit/receive board and associated with a first coupler, wherein the first coupler is electrically connected to the at least one signal pin pad;
      a second structure associated with the antenna and associated with a second coupler, wherein the second coupler is electrically connected to the at least one antenna element; and wherein the first structure and the second structure are mechanically isolated and electrically coupled via the first coupler and the second coupler;

transmitting a first signal from the at least one signal pin pad to the first structure;

transmitting the first signal from the first structure to the second structure via the electrically coupled first coupler and second coupler;

transmitting the first signal from the second coupler to the antenna; and radiating the first signal from the antenna.

9. The method of claim 8, wherein the first coupler comprises a first trace in a first serpentine pattern with at least a first resonant frequency of the first trace at a first frequency, and wherein the second coupler comprises a second trace in a second serpentine pattern with at least a first resonant frequency of the second trace at the first frequency.

10. The method of claim 8, wherein the first coupler comprises a first spiral ring resonator with at least a first resonant frequency of the first spiral ring resonator at a first frequency, and wherein the second coupler comprises a second spiral ring resonator with at least a first resonant frequency of the second spiral ring resonator at the first frequency.

11. The method of claim 8, wherein the first coupler comprises a first split ring resonator with at least a first resonant frequency of the first split ring resonator at first frequency, and wherein the second coupler comprises a second split ring resonator with at least a first resonant frequency of the second split ring resonator at the first frequency.

12. The method of claim 8, wherein the first coupler comprises a monopole antenna with at least a first resonant frequency of the monopole antenna at first frequency, and wherein the second coupler comprises helical coil with at least a first resonant frequency of the helical coil at the first frequency.

13. The method of claim 8, wherein the first coupler comprises a first helical coil with at least a first resonant frequency of the first helical coil at first frequency, and wherein the second coupler comprises a second helical coil with at least a first resonant frequency of the second helical coil at the first frequency.

14. The method of claim 8, wherein the antenna comprises one or more 3D printed structures.

\* \* \* \* \*